United States Patent
Kobayashi

(10) Patent No.: US 11,492,729 B2
(45) Date of Patent: Nov. 8, 2022

(54) FIBER PROCESSING DEVICE AND FIBER BODY MANUFACTURING APPARATUS

(71) Applicant: SEIKO EPSON CORPORATION, Tokyo (JP)

(72) Inventor: Nao Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 17/031,962

(22) Filed: Sep. 25, 2020

(65) Prior Publication Data
US 2021/0095400 A1   Apr. 1, 2021

(30) Foreign Application Priority Data
Sep. 27, 2019   (JP) .............................. JP2019-176770

(51) Int. Cl.
| | | |
|---|---|---|
| *D01H 4/38* | (2006.01) | |
| *B07B 1/18* | (2006.01) | |
| *B07B 1/22* | (2006.01) | |
| *D21D 5/06* | (2006.01) | |
| *D01G 15/20* | (2006.01) | |

(52) U.S. Cl.
CPC ................ *D01H 4/38* (2013.01); *B07B 1/18* (2013.01); *B07B 1/22* (2013.01); *D01G 15/20* (2013.01); *D21D 5/06* (2013.01)

(58) Field of Classification Search
CPC .. D01H 4/38; B07B 1/18; B07B 1/185; B07B 1/20; B07B 1/22; B07B 1/24; B07B 1/26; D01G 15/20; D21D 5/06; D21D 5/046; D21D 5/14; D04H 1/26; D04H 1/4274; D04H 1/60; D04H 1/732; D21F 9/00; D21B 1/08; Y02W 30/64
See application file for complete search history.

(56) References Cited

U.S. PATENT DOCUMENTS

| | | | |
|---|---|---|---|
| 5,609,046 A | 3/1997 | Fleissner | |
| 5,793,561 A * | 8/1998 | Ibaraki | F16C 17/026 384/114 |
| 7,310,859 B2 | 12/2007 | Fleissner | |
| 9,428,862 B2 * | 8/2016 | Higuchi | D21F 11/00 |
| 9,476,161 B2 * | 10/2016 | Higuchi | D21H 3/00 |
| 9,840,023 B2 * | 12/2017 | Nakamura | B27N 3/04 |
| 9,856,104 B2 * | 1/2018 | Fujita | B65H 20/02 |

(Continued)

FOREIGN PATENT DOCUMENTS

| | | |
|---|---|---|
| JP | H08-013318 A | 1/1996 |
| JP | H08-115512 A | 5/1996 |

(Continued)

*Primary Examiner* — Gene O Crawford
*Assistant Examiner* — Muhammad Awais
(74) *Attorney, Agent, or Firm* — Global IP Counselors, LLP

(57) ABSTRACT

A fiber processing device includes a drum having a plurality of openings on an outer peripheral surface, sieving a raw material containing fibers, and configured to rotate about a rotation axis, a housing that supports the drum, a guide portion (convex portion) provided on an outer peripheral surface of the drum; and a restriction portion (bearing) that restricts movement of the drum in a direction of the rotation axis by contacting the convex portion. At least one of the restriction portion and the guide portion is configured to rotate about an axis (rotation axis) orthogonal to the rotation axis.

10 Claims, 9 Drawing Sheets

(56) References Cited

U.S. PATENT DOCUMENTS

| | | | |
|---|---|---|---|
| 9,890,500 B2* | 2/2018 | Higuchi | ............... D21F 13/00 |
| 9,963,826 B2* | 5/2018 | Higuchi | ................ D21F 1/60 |
| 2017/0037550 A1* | 2/2017 | Miyazawa | ............ D04H 1/26 |

FOREIGN PATENT DOCUMENTS

| | | |
|---|---|---|
| JP | 2007-501343 A | 1/2007 |
| JP | 2016-113710 A | 6/2016 |

* cited by examiner

FIBER PROCESSING DEVICE AND FIBER BODY MANUFACTURING APPARATUS

The present application is based on, and claims priority from JP Application Serial Number 2019-176770, filed Sep. 27, 2019, the disclosure of which is hereby incorporated by reference herein in its entirety.

BACKGROUND

1. Technical Field

The present disclosure relates to a fiber processing device and a fiber body manufacturing apparatus including the fiber processing device.

2. Related Art

In the related art, a sheet manufacturing apparatus (fiber body manufacturing apparatus) for manufacturing a new sheet using waste paper as a raw material is known (for example, JP-A-2016-113710).

The fiber body manufacturing apparatus disclosed in JP-A-2016-113710 includes a supply section that supplies a raw material containing fibers, a crushing section that crushes the raw material supplied by the supply section, a defibration section that defibrates crushed pieces crushed in the crushing section into defibrated materials, a selecting section (fiber processing device) that selects the defibrated materials according to a length of a fiber, a forming section that forms a sheet, and the like.

The fiber processing device includes, for example, a cylindrical sieve, and selects the defibrated materials introduced into the sieve from an introduction port into a passing material (defibrated material suitable for sheet manufacturing) that passes through the sieve and a non-passing material (defibrated material not suitable for sheet manufacturing) that does not pass through the sieve. The defibrated material suitable for sheet manufacturing is sent out toward the forming section, and the defibrated material not suitable for sheet manufacturing is discharged from a discharge port.

The fiber body manufacturing apparatus removes unnecessary substances from the defibrated material suitable for sheet manufacturing, mixes a resin for binding the fibers to the defibrated material suitable for sheet manufacturing from which unnecessary substances are removed, and then forms the mixture of the defibrated material and the resin in the forming section to manufacture a new sheet.

In the fiber processing device, since the defibrated material introduced into the sieve flows in the direction from the introduction port toward the discharge port, a force in the direction from the introduction port toward the discharge port acts on the sieve. Therefore, when the fiber processing device is used for a long period of time, the position of the sieve may become unstable due to the force in the direction from the introduction port toward the discharge port acting on the sieve.

SUMMARY

According to an aspect of the present disclosure, there is provided a fiber processing device. The fiber processing device includes: a drum having a plurality of openings on an outer periphery, sieving a raw material containing fibers, and configured to rotate about a rotation axis; a housing that supports the drum; a guide portion provided on an outer peripheral surface of the drum; and a restriction portion that restricts movement of the drum in a direction of the rotation axis by contacting the guide portion. At least one of the restriction portion and the guide portion is configured to rotate about an axis orthogonal to the rotation axis.

In the fiber processing device, the restriction portion may be provided in the housing.

In the fiber processing device, the guide portion may be a convex portion protruding outward from the outer peripheral surface, and the restriction portion may be a bearing configured to rotate about the axis orthogonal to the rotation axis.

In the fiber processing device, an outer ring of the bearing may be covered with a material having a hardness lower than a hardness of the convex portion.

In the fiber processing device, the guide portion may be a groove recessed inward from the outer peripheral surface, and the restriction portion may be a bearing that is disposed inside the groove and configured to rotate about the axis orthogonal to the rotation axis.

In the fiber processing device, an outer ring of the bearing may be covered with a material having a hardness lower than a hardness of a wall surface of the groove.

In the fiber processing device, the guide portion may be a bearing configured to rotate about the axis orthogonal to the rotation axis, and the restriction portion may be a frame disposed in the direction of the rotation axis with respect to the bearing.

In the fiber processing device, the guide portion may be a convex portion that is disposed so as to intersect a surface orthogonal to the rotation axis and protrudes outward from the outer peripheral surface, the convex portion meandering in the direction of the rotation axis, and the restriction portion may be a bearing configured to rotate about the axis orthogonal to the rotation axis.

In the fiber processing device, the guide portion may be a groove that is disposed so as to intersect a surface orthogonal to the rotation axis and is recessed inward from the outer peripheral surface, the groove meandering in the direction of the rotation axis of the drum, and the restriction portion may be a bearing that is disposed inside the groove and configured to rotate about the axis orthogonal to the rotation axis.

According to another aspect of the present disclosure, there is provided a fiber body manufacturing apparatus. The fiber body manufacturing apparatus includes the fiber processing device, a mesh that accumulates the fibers which pass through the openings, a pressurization section that pressurizes the fibers accumulated on the mesh, and a supply section that supplies a binder which binds the fibers to each other upstream of the pressurization section.

DESCRIPTION OF EXEMPLARY EMBODIMENTS

1. Embodiment 1

1.1 Outline of Fiber Body Manufacturing Apparatus

Figure 1:
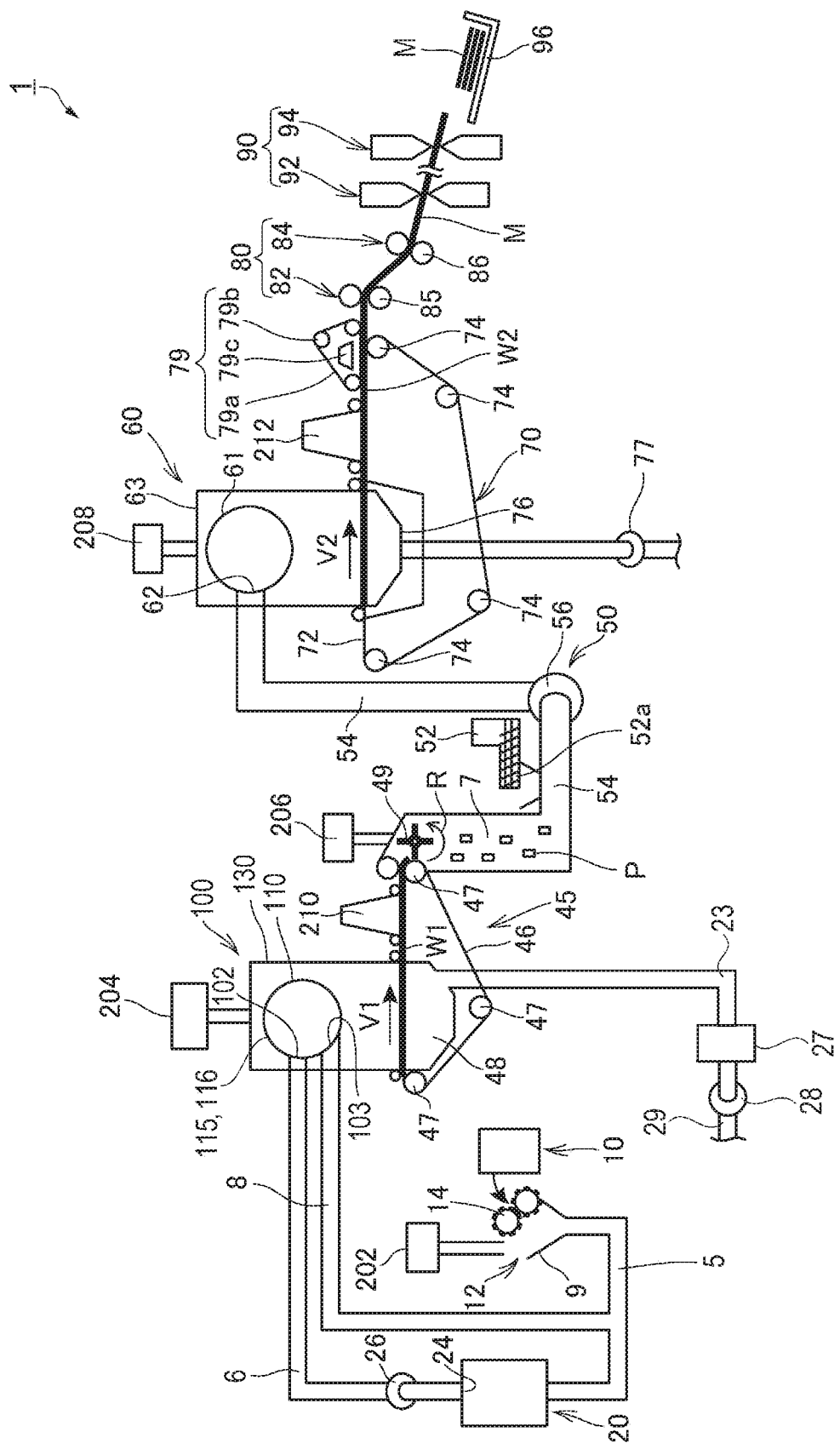
FIG. 1 is a schematic diagram illustrating a configuration of a fiber body manufacturing apparatus according to Embodiment 1.

FIG. 1 is a schematic diagram illustrating a configuration of a fiber body manufacturing apparatus 1 according to Embodiment 1. First, an outline of the fiber body manufacturing apparatus 1 according to the present embodiment will be described with reference to FIG. 1.

The fiber body manufacturing apparatus 1 defibrates a sheet material such as a piece of paper (waste paper) containing fibers by a dry method to fiberize the sheet material, and then pressurizes, heats, and cuts the fiberized material, thereby manufacturing new paper (sheet M). Further, by mixing various binders into a defibrated material in which waste paper is defibrated and fiberized, the fiber body manufacturing apparatus 1 can improve the bonding strength and whiteness of a paper product, and can add functions such as color, fragrance, and flame retardance according to the application.

The defibrated material is an example of the raw material containing fibers in the present application.

As illustrated in FIG. 1, the fiber body manufacturing apparatus 1 includes a raw material supply section 10, a crushing section 12, a defibration section 20, a fiber processing device 100 according to Embodiment 1, a first web forming section 45, a rotating body 49, a mixing section 50, an accumulating section 60, a second web forming section 70, a transporting section 79, a sheet forming section 80, and a cutting section 90, which are arranged in order along a transport path where waste paper, defibrated materials, and the like are transported.

Further, the fiber body manufacturing apparatus 1 includes humidifying sections 202, 204, 206, 208, 210, and 212, for the purpose of humidifying waste paper and defibrated materials, and/or for humidifying the space where waste paper and defibrated materials move. The humidifying sections 202, 204, 206, and 208 each are a vaporization type or warm air vaporization type humidifier, have a filter (not illustrated) for wetting water, and supply humidified gas with increased humidity by passing gas (air) through the filter. The humidifying sections 210 and 212 each are an ultrasonic humidifier, have a vibrating section (not illustrated) that atomizes water, and supply mist generated by the vibrating section.

The humidifying sections 202, 204, 206, 208, 210, and 212 each may have any specific configuration, such as a steam type, a vaporization type, a warm air vaporization type, and an ultrasonic type.

The raw material supply section 10 supplies waste paper as a sheet material to the crushing section 12. The sheet material may be any material as long as it contains fibers. For example, as the sheet material, paper, pulp, pulp sheet, cloth including non-woven fabric, woven fabric, or the like can be used. The raw material supply section 10 can include, for example, a stacker (not illustrated) that stacks and stores waste paper, and an automatic feeding device (not illustrated) that sends out the waste paper from the stacker to the crushing section 12.

The crushing section 12 cuts (crushes) the waste paper supplied by the raw material supply section 10 with a crushing blade 14 to make crushed pieces. The crushing blade 14 cuts the waste paper in the air or the like. The crushing section 12 includes, for example, a pair of crushing blades 14 that cut waste paper sandwiched therebetween, and a driving section (not illustrated) that rotates the crushing blade 14, and can have the same configuration as a so-called shredder. The crushed pieces may have any shape or size and may be suitable for a defibrating process in the defibration section 20. For example, the crushing section 12 cuts waste paper into a piece of paper having a size of 1 cm to several cm square or smaller.

The crushing section 12 has a chute 9 that receives the crushed pieces cut by the crushing blade 14 and falling. The chute 9 has, for example, a tapered shape in which the width gradually narrows in a direction in which the crushed pieces advance. The chute 9 is coupled to a pipe 5 communicating with the defibration section 20, and the pipe 5 forms a transport path for transporting the waste paper (crushed pieces) cut by the crushing blade 14 to the defibration section 20. The crushed pieces are collected by the chute 9 and transferred to the defibration section 20 through the pipe 5.

The humidifying section 202 supplies humidified gas to the chute 9 of the crushing section 12 or the vicinity of the chute 9. Thereby, it is possible to suppress the phenomenon that a crushed material cut by the crushing blade 14 is adsorbed to the inner surface of the chute 9 or the pipe 5 due to static electricity. In addition, since the crushed material cut by the crushing blade 14 is transferred to the defibration section 20 together with the humidified gas, it is possible to expect an effect of suppressing adhesion of the defibrated material inside the defibration section 20.

The defibration section 20 defibrates the crushed material cut by the crushing section 12. More specifically, the defibration section 20 defibrates the crushed pieces cut by the crushing section 12 to generate a defibrated material. The defibrated material is a material obtained by defibrating waste paper into a fibrous shape until the waste paper loses its original shape. The defibration section 20 also has a function of separating substances such as resin particles, ink, toner, and anti-bleeding agent attached to waste paper from the fibers.

A material that is passed through the defibration section 20 is referred to as a defibrated material. The defibrated material includes, in addition to the fibers of the unwound waste paper, unnecessary substances that are separated from the fibers when the waste paper is unwound (resins that bind the fibers to each other, coloring agents such as ink and toner, anti-bleeding agents, or additives such as paper strengthening agents).

The defibration section 20 performs defibration by a dry method. The defibration section 20 is, for example, an impeller mill, and has a rotor (not illustrated) that rotates at a high speed and a liner (not illustrated) located on the outer periphery of the rotor.

The crushed pieces cut by the crushing section 12 are sandwiched between the rotor and the liner of the defibration section 20 to be defibrated. The defibration section 20 generates an airflow by the rotation of the rotor. By this airflow, the defibration section 20 can suck the crushed pieces from the pipe 5 and send out the defibrated material to a pipe 6 from the discharge port 24. A defibration section blower 26 is attached to the pipe 6. The defibrated material generated in the defibration section 20 is transferred to the fiber processing device 100 through the pipe 6 by the airflow generated by the defibration section blower 26.

The fiber processing device 100 has an introduction port 102 through which the defibrated material defibrated by the defibration section 20 flows in together with the airflow from the pipe 6. The fiber processing device 100 selects the defibrated material introduced from the introduction port 102 according to the length of the fiber. Specifically, the fiber processing device 100 selects a defibrated material having a size equal to or smaller than a predetermined size as a first selected material, and a defibrated material larger than the first selected material as a second selected material, in the defibrated materials defibrated by the defibration section 20. The first selected material contains fibers or particles, and the second selected material contains, for example, large fibers, undefibrated pieces (crushed pieces that have not been sufficiently defibrated), or lumps in which defibrated fibers are aggregated or entangled.

The fiber processing device 100 has a drum 110 and a housing 130 that supports the drum 110. The housing 130 is an example of the housing in the present application.

Figure 2:
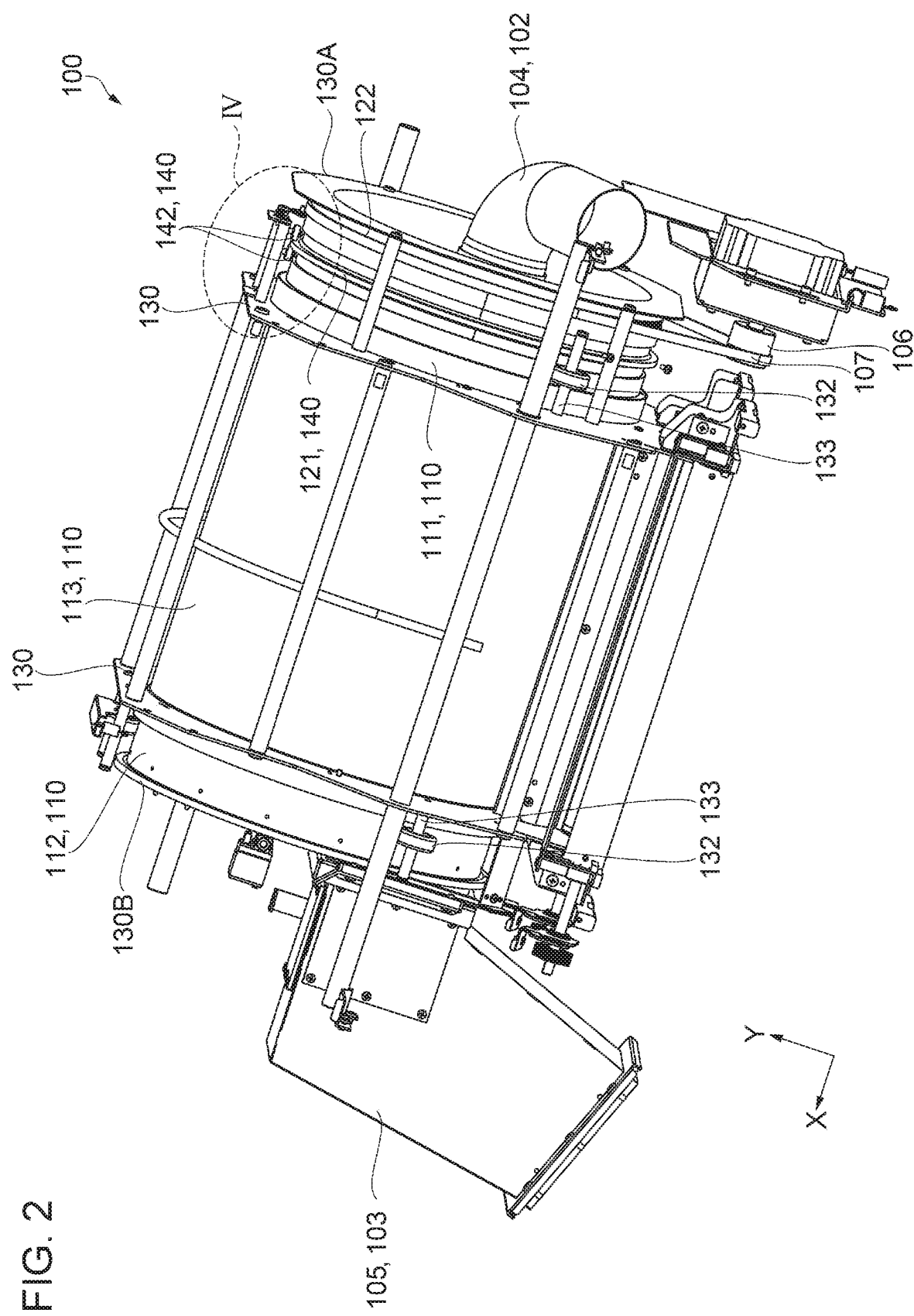
FIG. 2 is a perspective view illustrating an outline of a fiber processing device according to Embodiment 1.
Figure 3:
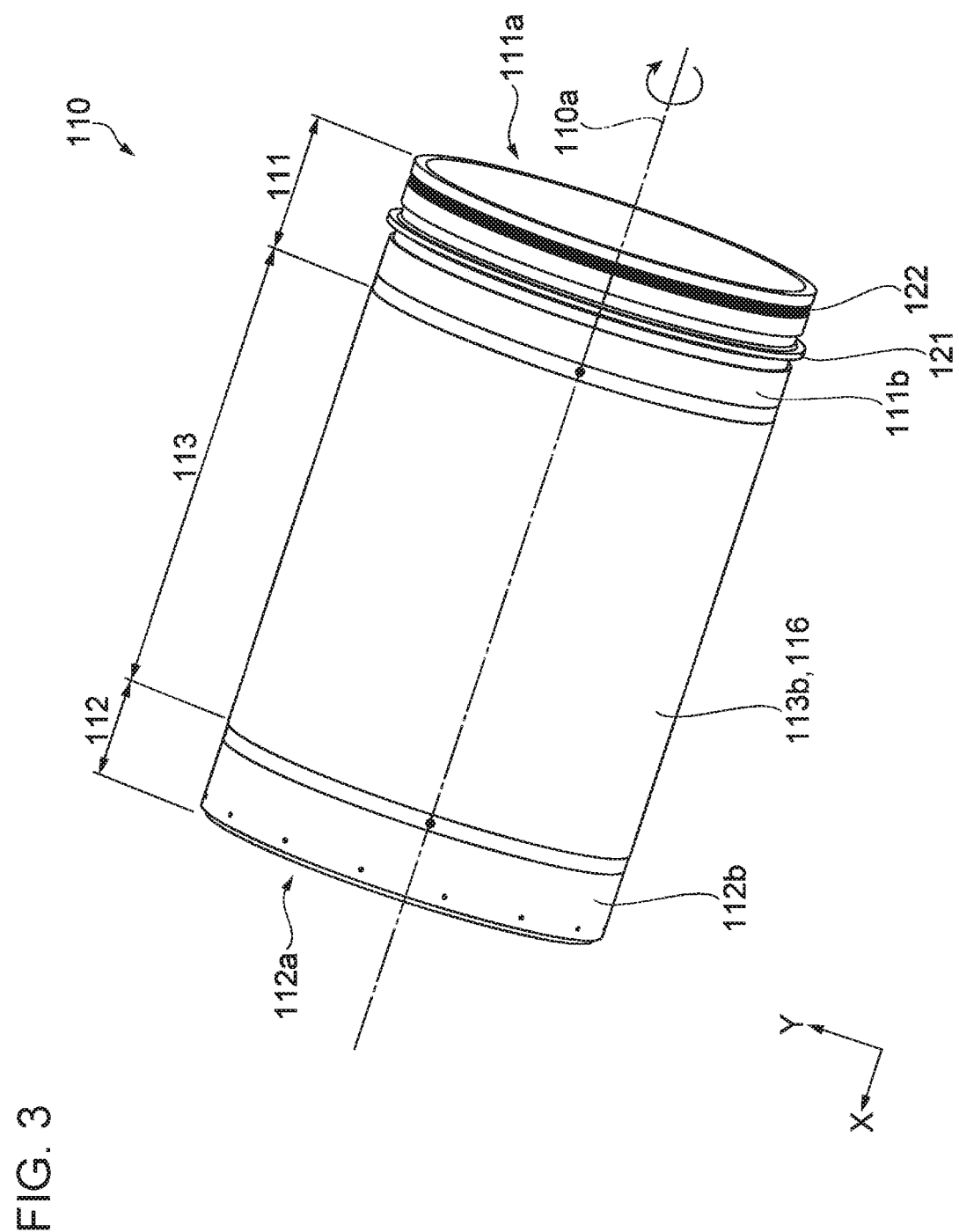
FIG. 3 is a perspective view of a drum which is a component of the fiber processing device.

The drum 110 is a cylindrical sieve that is rotationally driven by a motor 106 (see FIG. 2), and can rotate about a rotation axis 110*a* (see FIG. 3). The drum 110 has a net 115 (filter or screen) provided with a plurality of openings 116 on the outer periphery thereof. Although details will be described later, the plurality of openings 116 are provided in an outer peripheral surface 113*b* (see FIG. 6) of a sieve portion 113 (see FIG. 6) of the drum 110, and sift the defibrated material (raw material containing fibers).

In this way, the fiber processing device 100 has the plurality of openings 116 on the outer periphery (outer peripheral surface 113*b*), sifts the defibrated material (raw material containing fibers), and includes the drum 110 that can rotate about the rotation axis 110*a* and the housing 130 that supports the drum 110.

In this way, the drum 110 serves as a sieve having the plurality of openings 116 of the net 115 on the outer periphery (outer peripheral surface 113*b*), sifts the defibrated material (raw material containing fibers) introduced from the introduction port 102, and selects the defibrated material into the first selected material smaller than the size of the opening 116 and the second selected material larger than that of the opening 116. As the net 115 of the drum 110, for example, a wire net, an expanded metal obtained by extending a notched metal plate, or a punching metal having a hole formed in the metal plate by a press machine or the like can be used.

The defibrated material introduced from the introduction port 102 is sent into the inside of the drum 110 together with the airflow, and is selected into the first selected material and the second selected material by the rotation of the drum 110. The first selected material passes through the opening 116 of the drum 110, and falls toward a mesh belt 46 of the first web forming section 45 located below the drum 110. The second selected material that cannot pass through the opening 116 of the drum 110 is flowed by the airflow flowing into the drum 110 from the introduction port 102, is guided to a discharge port 103, is sent out from the discharge port 103 to a pipe 8, is returned to the defibration section 20 through the pipe 8, and is defibrated again.

The details of the fiber processing device 100 will be described later. The first selected material is an example of the fibers that pass through the openings in the present application. The mesh belt 46 is an example of the mesh in the present application.

The first web forming section 45 includes the mesh belt 46, rollers 47, and a suction section (suction mechanism) 48. The mesh belt 46 is an endless belt, is suspended by three rollers 47, and is transported in the direction indicated by an arrow in the drawing by the movement of the rollers 47. The surface of the mesh belt 46 is formed of a net having openings of a predetermined size. In the first selected material that falls from the fiber processing device 100, the fine particles having a size that can pass through the net mesh fall below the mesh belt 46, and the fibers having a size that cannot pass through the net mesh are accumulated on the mesh belt 46 and are transported in the arrow direction together with the mesh belt 46.

During the operation of manufacturing the sheet M, the mesh belt 46 moves at a constant speed V1.

The fine particles that fall from the mesh belt 46 include defibrated materials having a relatively small size and low density (resin particles, coloring agents, additives, or the like), which are unnecessary substances not suitable for manufacturing the sheet M. That is, the first web forming section 45 removes unnecessary substances that are not suitable for manufacturing the sheet M from the first selected material. The remainder obtained by removing the unnecessary substances from the first selected material by the first web forming section 45 is a material suitable for manufacturing the sheet M, and is accumulated on the mesh belt 46 to form a first web W1. That is, the mesh belt 46 accumulates the first selected material that passes through the opening 116 to form the first web W1.

In this way, the fiber body manufacturing apparatus 1 according to the present embodiment has the mesh belt 46 (mesh in the present application) that accumulates the first selected material (fiber in the present application) that passes through the opening 116.

A suction section 48 that sucks air from below the mesh belt 46 is provided below the mesh belt 46. A dust collector 27 and a collection blower 28 are provided below the suction section 48. The suction section 48 and the dust collector 27 are coupled by a pipe 23, and the dust collector 27 and the collection blower 28 are coupled by a pipe 29.

The collection blower 28 sucks air through the dust collector 27 and the suction section 48. When the collection blower 28 sucks air through the dust collector 27 and the suction section 48, the fine particles that pass through the net mesh of the mesh belt 46 are sucked together with the air and sent to the dust collector 27 through the pipe 23. The dust collector 27 separates and stores the fine particles that have passed through the mesh belt 46 from the airflow. In addition, the air discharged by the collection blower 28 is discharged outside the fiber body manufacturing apparatus 1 through the pipe 29.

The fibers obtained by removing the unnecessary substances from the first selected material are accumulated on the mesh belt 46 to form the first web W1. Since the collection blower 28 performs suction, the formation of the first web W1 on the mesh belt 46 is promoted, and the unnecessary substances are quickly removed.

The humidifying section 204 supplies humidified gas in the space including the drum 110. The humidified gas humidifies the first selected material inside the fiber processing device 100. Thereby, the adhesion of the first selected material to the mesh belt 46 due to an electrostatic force can be weakened, and the first selected material can be easily peeled from the mesh belt 46. Further, it is possible to suppress the first selected material from adhering to the inner wall of the rotating body 49 or the housing 130 due to an electrostatic force. In addition, the suction section 48 can efficiently suck unnecessary substances.

In the transport path of the mesh belt 46, the humidifying section 210 supplies a gas containing mist downstream of the fiber processing device 100. The mist, which is fine particles of water generated by the humidifying section 210, falls toward the first web W1 and supplies water to the first web W1. Thereby, the amount of water contained in the first web W1 is adjusted, and adsorption of fibers to the mesh belt 46 due to static electricity or the like is suppressed.

The rotating body 49 that divides the first web W1 accumulated on the mesh belt 46 is provided downstream of the mesh belt 46 in the transport direction of the first web W1. The first web W1 is peeled from the mesh belt 46 at a position where the mesh belt 46 is folded back by the roller 47 and is divided by the rotating body 49.

The first web W1 is a soft material in the form of a web in which fibers are accumulated. The rotating body 49 loosens the fibers of the first web W1 and processes the fibers into a state where the resin is easily mixed in the mixing section 50 described later.

The rotating body 49 may have any configuration, but in the present embodiment, the rotating body 49 has a rotary blade shape in which plate-shaped blades rotate. The rotating body 49 is disposed at a position where it comes into contact with the first web W1 peeled from the mesh belt 46. By rotating the rotating body 49 (for example, rotating in the direction indicated by an arrow R in the drawing), the first web W1 peeled from the mesh belt 46 and transported is collided with the blades of the rotating body 49 to be divided, and a subdivided body P is generated.

The rotating body 49 is preferably installed at a position where the blades of the rotating body 49 do not collide with the mesh belt 46. For example, when a distance between the tips of the blades of the rotating body 49 and the mesh belt 46 is set to 0.05 mm or more and 0.5 mm or less, the rotating body 49 can efficiently divide the first web W1 without damaging the mesh belt 46.

The subdivided body P divided by the rotating body 49 descends inside a pipe 7 and is sent to the mixing section 50 by the airflow flowing inside the pipe 7.

In addition, the humidifying section 206 supplies humidified gas to the space including the rotating body 49. Thereby, it is possible to suppress the phenomenon that the fibers are adsorbed to the inside of the pipe 7 or the blades of the rotating body 49 due to static electricity. In addition, since the gas with high humidity is supplied to the mixing section 50 through the pipe 7, the adverse effect of static electricity is also suppressed in the mixing section 50.

The mixing section 50 includes a supply section 52 that supplies a binder which binds fibers to each other, a pipe 54 that communicates with the pipe 7 and through which an airflow containing the subdivided body P flows, and a mixing blower 56. The supply section 52 supplies a binder (resin) that binds the fibers to each other upstream of a pressurization section 82 described later. As described above, the subdivided body P is a fiber from which unnecessary substances are removed from the first selected material. The mixing section 50 mixes the fibers forming the subdivided body P with a binder containing a resin.

Although the details will be described later, the sheet M is manufactured by subjecting a mixture (second web W2) of the fibers forming the subdivided body P and the resin to at least one of pressurization and heating. In order to stabilize the quality of the sheet M, it is important to control the mixing ratio of the fibers forming the subdivided body P and the resin to be constant.

In the mixing section 50, an airflow is generated by the mixing blower 56, and the subdivided body P and the binder are transported while being mixed in the pipe 54. The subdivided body P is loosened in the process of flowing inside the pipe 7 and the pipe 54, and has a finer fibrous shape.

The supply section 52 is coupled to a binder cartridge (not illustrated) that stores the binder, and supplies the binder inside the binder cartridge to the pipe 54. The supply section 52 temporarily stores the binder made of fine powder or fine particles inside the binder cartridge. The supply section 52 has a discharge section 52a that sends the temporarily stored binder to the pipe 54.

The discharge section 52a includes a feeder (not illustrated) that sends the binder stored in the supply section 52 to the pipe 54, and a shutter (not illustrated) that opens and closes a pipe line that couples the feeder and the pipe 54. When the shutter is closed, the pipe line coupling the discharge section 52a and the pipe 54 is closed, and the supply of the binder from the supply section 52 to the pipe 54 is interrupted.

The binder supplied by the supply section 52 contains a resin for binding a plurality of fibers. The resin contained in the binder is a thermoplastic resin or a thermosetting resin, and examples thereof include an AS resin, an ABS resin, polypropylene, polyethylene, polyvinyl chloride, polystyrene, an acrylic resin, a polyester resin, polyethylene terephthalate, polyphenylene ether, polybutylene terephthalate, nylon, polyamide, polycarbonate, polyacetal, polyphenylene sulfide, polyether ether ketone, and the like. These resins may be used alone or in an appropriate mixture. That is, the binder may contain a single substance, may be a mixture, and may contain a plurality of types of particles, each of which is composed of a single substance or a plurality of substances. In addition, the binder may be fibrous or powdery.

The resin contained in the binder melts by heating and binds the plurality of fibers to each other. Therefore, when the resin is not heated to the melting temperature while the fibers and the resin are mixed, the fibers are not bound to each other.

The binder supplied by the supply section 52 may contain, in addition to the resin that binds the fibers, a colorant for coloring the fibers, an aggregation inhibitor for suppressing the aggregation of the fibers or the resin, and a flame retardant for making the fibers difficult to burn, according to the type of sheet to be manufactured. In addition, the binder containing no colorant may be colorless, may have a light color that can be regarded as colorless, or may be white.

Due to the airflow generated by the mixing blower 56, the subdivided body P that falls in the pipe 7 and the binder supplied by the supply section 52 are sucked into the pipe 54 and pass through the inside of the mixing blower 56. Due to the action of the airflow generated by the mixing blower 56 and/or the action of the rotating portion such as the blades of the mixing blower 56, the fibers forming the subdivided body P and the binder are mixed and sent through the pipe 54 to the accumulating section 60.

The accumulating section 60 introduces the mixture that has passed through the mixing section 50 from the introduction port 62, loosens the entangled fibers, and causes the fibers to descend while being dispersed in the gas. Further, when the binder supplied from the supply section 52 is a fibrous resin, the accumulating section 60 loosens the entangled fibrous resin. Thereby, the accumulating section 60 can accumulate the mixture on the second web forming section 70 with good uniformity.

The accumulating section 60 has a drum 61 and a housing 63 that supports the drum 61. The drum 61 is a cylindrical sieve that is rotationally driven by a motor. The drum 61 has a net (filter or screen) and serves as a sieve. Due to the net mesh, the drum 61 allows fibers and particles having a smaller net opening (opening) to pass through, and the passed fibers and particles fall from the drum 61. The configuration of the drum 61 is the same as the configuration of the drum 110.

The second web forming section 70 is disposed below the drum 61. The second web forming section 70 accumulates the mixture that has passed through the accumulating section 60 to form the second web W2. The second web forming section 70 has, for example, a mesh belt 72, rollers 74, and a suction mechanism 76.

The mesh belt 72 is an endless belt, is suspended by a plurality of the rollers 74, and is transported in the direction indicated by an arrow in the drawing by the movement of the rollers 74. The mesh belt 72 is made of, for example, metal, resin, cloth, or non-woven fabric. The surface of the mesh belt 72 is formed of a net having openings of a predetermined size. In the fibers and particles that fall from the drum 61, the fine particles having a size that can pass through the net mesh fall below the mesh belt 72, and the fibers having a size that cannot pass through the net mesh are accumulated on the mesh belt 72 and are transported in the arrow direction together with the mesh belt 72.

During the operation of manufacturing the sheet M, the mesh belt 72 moves at a constant speed V2.

The net mesh of the mesh belt 72 is fine, and it can be sized so that most of the fibers and particles that fall from the drum 61 do not pass through.

The suction mechanism 76 is provided below the mesh belt 72. The suction mechanism 76 includes a suction blower 77, and a suction force of the suction blower 77 generates an airflow from the accumulating section 60 toward the mesh belt 72.

The suction mechanism 76 sucks the mixture dispersed in the gas by the accumulating section 60 onto the mesh belt 72. Thereby, the formation of the second web W2 on the mesh belt 72 can be promoted, and the discharging speed from the accumulating section 60 can be increased. Further, the suction mechanism 76 can form a downflow in the falling path of the mixture, and can prevent the defibrated material and the binder from being entangled with each other during the fall.

The suction blower 77 discharges the gas sucked from the suction mechanism 76 outside the fiber body manufacturing apparatus 1 through a collection filter (not illustrated). The gas sucked by the suction blower 77 may be sent to the dust collector 27, and the dust collector 27 may collect unnecessary substances contained in the gas sucked by the suction mechanism 76.

The humidifying section 208 supplies humidified gas the space including the drum 61. The humidified gas can humidify the inside of the accumulating section 60, and thereby adhesion of fibers and particles to the housing 63 due to an electrostatic force can be suppressed, and the fibers and particles can promptly fall onto the mesh belt 72 to form the second web W2 having a preferable shape.

In this way, the second web W2 containing a large amount of gas and in a soft and swollen state is formed by passing through the accumulating section 60 and the second web forming section 70. Then, the second web W2 accumulated on the mesh belt 72 is transported to the sheet forming section 80.

In the transport path of the mesh belt 72, the humidifying section 212 supplies a gas containing mist downstream of the accumulating section 60. Thereby, the mist generated by the humidifying section 212 is supplied to the second web W2, and the amount of water contained in the second web W2 is adjusted. Further, the adsorption of fibers to the mesh belt 72 due to static electricity or the like is suppressed.

In addition, the transporting section 79 that sends out the second web W2 on the mesh belt 72 to the sheet forming section 80 is provided downstream of the transport path of the mesh belt 72. The transporting section 79 has, for example, a mesh belt 79a, a roller 79b, and a suction mechanism 79c.

The suction mechanism 79c includes a blower (not illustrated), and generates an upward airflow on the mesh belt 79a by the suction force of the blower. The airflow sucks the second web W2, and the second web W2 is separated from the mesh belt 72 and adsorbed to the mesh belt 79a. The mesh belt 79a moves by the rotation of the roller 79b, and sends out the second web W2 to the sheet forming section 80. For example, the movement speed of the mesh belt 72 and the movement speed of the mesh belt 79a are the same.

In this way, the transporting section 79 peels the second web W2 formed on the mesh belt 72 from the mesh belt 72, and sends out the second web W2 to the sheet forming section 80.

The sheet forming section 80 forms the sheet M from the accumulation (second web W2) accumulated by the accumulating section 60. Specifically, the sheet forming section 80 pressurizes and heats the second web W2 sent out from the transporting section 79 to form the sheet M. The sheet forming section 80 applies heat to the fibers and the binder contained in the second web W2 to bind the plurality of fibers in the mixture to each other through the binder (resin).

The sheet forming section 80 includes the pressurization section 82 that pressurizes the second web W2, and a heating section 84 that heats the second web W2 pressurized by the pressurization section 82. In addition, since the second web W2 can be paraphrased as the first web W1, it can be paraphrased that the pressurization section 82 pressurizes the first web W1 (fibers in the present application) accumulated on the mesh belt 46 (mesh in the present application).

That is, the fiber body manufacturing apparatus 1 according to the present embodiment has the pressurization section 82 that pressurizes the first web W1 (fibers in the present application) accumulated on the mesh belt 46 (mesh in the present application).

The pressurization section 82 includes a pair of calender rollers 85, and pressurizes the second web W2 interposed therebetween with a predetermined nip pressure. The thickness of the second web W2 is reduced by being pressurized, and thereby the density of the second web W2 is increased. One of the pair of calender rollers 85 is a driving roller which is driven by a motor (not illustrated), and the other is a driven roller which is driven to rotate with respect to the driving roller. The calender roller 85 is rotated by a driving force of the motor, pressurizes the second web W2, and transports the second web W2 having a high density due to the pressurization toward the heating section 84.

The heating section 84 includes, for example, a heating roller, a hot press forming machine, a hot plate, a warm air blower, an infrared heater, a flash fixing device, and the like. In the present embodiment, the heating section 84 includes a pair of heating rollers 86. The heating rollers 86 are heated to a preset temperature by a heater installed inside or outside. The heating rollers 86 sandwich the second web W2 pressurized by the calender roller 85 to apply heat to form the sheet M. In addition, one of the pair of heating rollers 86 is a driving roller which is driven by a motor (not illustrated), and the other is a driven roller which is driven to rotate with respect to the driving roller. The heating rollers 86 are rotated by the driving force of the motor and transport the sheet M formed from the second web W2 toward the cutting section 90.

The cutting section 90 cuts the sheet M formed by the sheet forming section 80 and processes it into a sheet M of a predetermined size (hereinafter referred to as a single-cut sheet M). Specifically, the cutting section 90 has a first cutting section 92 that cuts the sheet M in a direction intersecting the transport direction of the sheet M, and a second cutting section 94 that cuts the sheet M in a direction parallel to the transport direction. The second cutting section 94 is disposed downstream of the first cutting section 92 in the transport direction of the sheet M. Then, the sheet M formed by the sheet forming section 80 is cut-processed by the first cutting section 92 and the second cutting section 94 into a single-cut sheet M of a predetermined size.

The single-cut sheet M cut-processed by the cutting section 90 is discharged toward a tray 96 and placed on the tray 96.

1.2 Outline of Fiber Processing Device

FIG. 2 is a perspective view illustrating an outline of the fiber processing device 100 according to the present embodiment. FIG. 3 is a perspective view of the drum 110 which is a component of the fiber processing device 100.

First, an outline of the fiber processing device 100 according to the present embodiment will be described with reference to FIGS. 2 and 3.

As illustrated in FIG. 3, the drum 110, which is a component of the fiber processing device 100, is a cylindrical tube and has a cavity therein. The cross-sectional shape of the drum 110 is circular. The drum 110 can rotate about the rotation axis 110a with the rotation axis 110a illustrated by a one-dot chain line in the drawing as the center of rotation. That is, the drum 110 can rotate clockwise as indicated by an arrow in the drawing. In addition, the rotation axis 110a is disposed at the center of the drum 110 having a circular cross section. In the following description, the direction parallel to the rotation axis 110a is an X direction, and the direction orthogonal to the rotation axis 110a is a Y direction. In addition, the tip side of the arrow indicating the direction is a + direction, and the base side of the arrow indicating the direction is a − direction. In addition, the direction in which the rotation axis 110a extends (X direction) is parallel to a horizontal plane.

In addition, the rotation axis 110a of the drum 110 is an example of the rotation axis in the present application.

As illustrated in FIG. 2, the fiber processing device 100 has the cylindrical drum 110, the housing 130 that supports the drum 110, the motor 106, and a belt 107.

The housing 130 is a member that supports the drum 110, the motor 106, and the like. A constituent material of the housing 130 is stainless steel or iron. By using stainless steel or iron as the constituent material of the housing 130, the mechanical strength of the housing 130 is enhanced, and the housing 130 can stably support the drum 110, the motor 106, and the like.

Further, four bearings 132 and two bearings 142 are attached to the housing 130. The four bearings 132 are arranged in contact with the lower portion of the drum 110. The two bearings 142 are arranged in a region IV surrounded by a broken line.

The details of the bearing 142 will be described later.

In FIG. 2, two bearings 132 out of the four bearings 132 are illustrated, and the other two bearings 132 out of the four bearings 132 are omitted. The four bearings 132 each are arranged on a horizontal plane. The bearings 132 are attached to the housing 130 via shaft members 133 extending in the X direction.

Specifically, the bearing 132 is a rolling bearing including an outer ring (not illustrated), rolling elements (not illustrated), an inner ring (not illustrated), and a cage (not illustrated). Each of the shaft members 133 is disposed inside the inner ring of the bearing 132, supports the inner ring of the bearing 132, and is fixed to the housing 130. In the bearing 132, the rolling elements are arranged between the outer ring and the inner ring, and are held by a cage so as not to contact each other. The rolling elements revolve while rolling between the outer ring and the inner ring while maintaining a constant distance.

Figure 6:
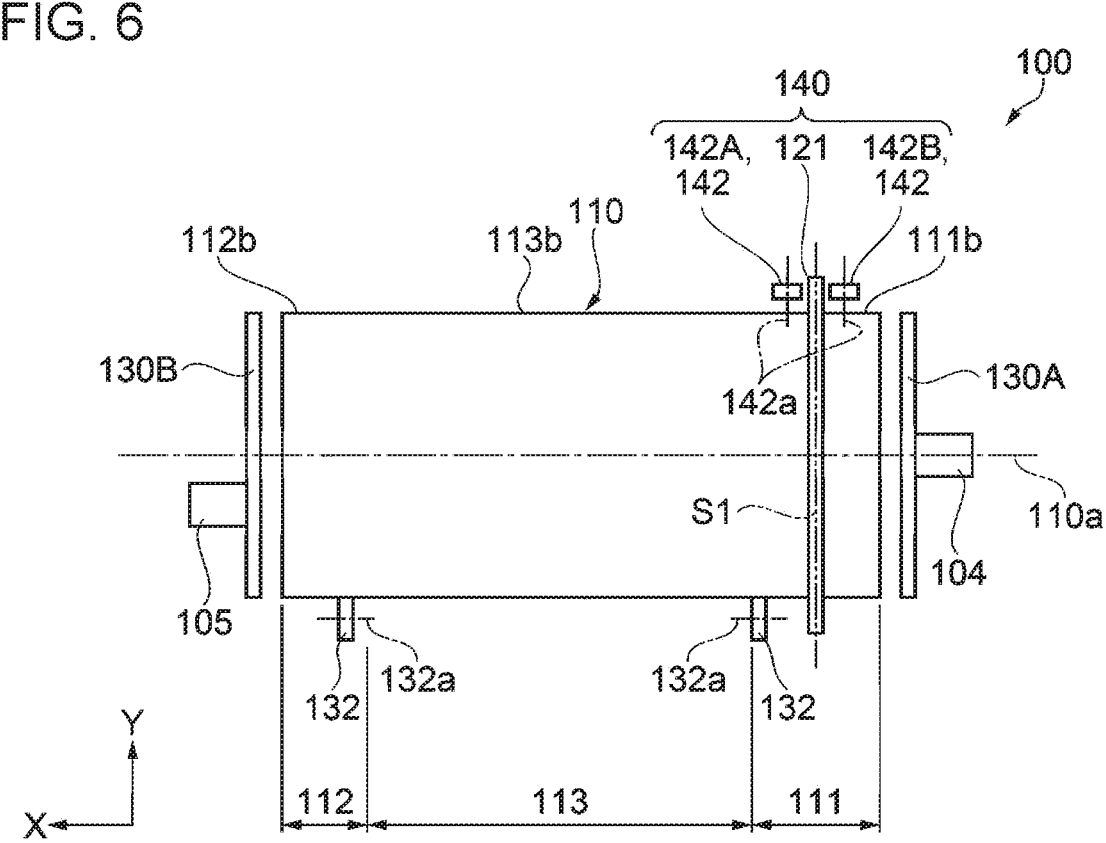
FIG. 6 is a schematic diagram of the fiber processing device according to Embodiment 1 having the displacement suppressing mechanism.

With such a configuration, the bearing 132 is supported by the housing 130 and can rotate about a rotation axis 132a (see FIG. 6).

The rotation axis 132a of the bearing 132 is disposed at the center of the shaft member 133. The rotation axis 132a of the bearing 132 is disposed parallel to the X direction in which the shaft member 133 extends. Then, each of the four bearings 132 can rotate about the rotation axis 132a that is parallel to the X direction.

Further, a pipe 104 having the introduction port 102 and a pipe 105 having the discharge port 103 are attached to the housing 130. In FIG. 2, the pipe 104 having the introduction port 102 is located in the −X direction, and the pipe 105 having the discharge port 103 is located in the +X direction. In the following description, the housing 130 to which the pipe 104 having the introduction port 102 is attached will be referred to as a housing 130A on the introduction port side, and the housing 130 to which the pipe 105 having the discharge port 103 is attached will be referred to as a housing 130B on the discharge port side. In addition, the pipe 104 having the introduction port 102 is coupled to the pipe 6 (see FIG. 1), and the pipe 105 having the discharge port 103 is coupled to the pipe 8 (see FIG. 1).

As illustrated in FIG. 3, the drum 110 is a cylindrical member, and has an end 111 disposed on the −X direction side, an end 112 disposed on the +X direction side, and the sieve portion 113 disposed between the ends 111 and 112. The end 111 has an opening 111a on the −X direction side, and the end 112 has an opening 112a on the +X direction side. The end 111 has an outer peripheral surface 111b, and the end 112 has an outer peripheral surface 112b.

Further, the sieve portion 113 has the outer peripheral surface 113b, which is an example of the outer periphery in the present application. The plurality of openings 116 are provided on the outer peripheral surface 113b of the sieve portion 113. That is, the drum 110 has the plurality of openings 116 on the outer periphery (outer peripheral surface 113b).

The constituent material of frames of the ends 111 and 112 and the sieve portion 113 is aluminum. In addition, the net 115 is attached to the frame of the sieve portion 113 made of aluminum. In this way, the main constituent material of the drum 110 is aluminum. The weight of the drum 110 is reduced by using aluminum as the main constituent material of the drum 110.

The end 111 of the drum 110 is provided with a convex portion 121 protruding outward from the outer peripheral surface 111b and a concave portion 122 recessed inward from the outer peripheral surface 111b. The convex portion 121 is disposed farther from the opening 111a than the concave portion 122. The end 111 and the convex portion 121 are integrally formed by processing the same member (aluminum). The constituent material of the convex portion 121 is the same aluminum as the constituent material of the end 111.

The outer peripheral surface 111b of the end 111 is an example of the outer peripheral surface in the present application.

Referring back to FIG. 2, the cylindrical drum 110 is placed on the four bearings 132. Specifically, the end 111 of the drum 110 is placed on two out of the four bearings 132, and the end 112 of the drum 110 is placed on two out of the four bearings 132.

Since the four bearings 132 are arranged on the horizontal plane, the drum 110 placed on the four bearings 132 is disposed on the horizontal plane. Further, the rotation axis 132a of the bearing 132 disposed at the center of the shaft member 133 and the rotation axis 110a of the drum 110 are arranged parallel to the horizontal plane.

A gap is provided between the housing 130A on the introduction port side and the end 111 of the drum 110. A gap is provided between the housing 130B on the discharge port side and the end 112 of the drum 110. That is, the drum 110 is not in contact with the housing 130A on the introduction port side and the housing 130B on the discharge port side.

The drum 110 is supported by the housing 130 via the bearing 132. That is, the drum 110 is in contact with a portion of the housing 130 to which the bearing 132 is attached, and is not in contact with other portions of the housing 130 (for example, the housing 130A on the introduction port side and the housing 130B on the discharge port). In other words, a gap is provided between the end 111 of the drum 110 and the housing 130A on the introduction port side and a gap is provided between the end 112 of the drum 110 and the housing 130B on the discharge port side so that the drum 110 does not come into contact with other portions of the housing 130.

With such a configuration, the drum 110 can rotate about the rotation axis 110a parallel to the X direction. Specifically, since the bearing 132 can rotate about the rotation axis 132a parallel to the X direction, the drum 110 disposed so as to be in contact with the four bearings 132 can also rotate about the rotation axis 110a parallel to the X direction. Further, the drum 110 can move in the X direction (+X direction and −X direction).

The belt 107 is wound around the concave portion 122 of the drum 110 and the motor 106. Then, when the motor 106 is rotationally driven, the rotational force of the motor 106 is transmitted to the drum 110 via the belt 107.

With such a configuration, when the motor 106 is rotationally driven, the drum 110 rotates about the rotation axis 110a.

In the fiber processing device 100, the defibrated material (raw material containing fibers) is sent into the drum 110 together with the airflow. The defibrated material introduced from the pipe 104 provided with the introduction port 102 is selected into the first selected material smaller than the size of the opening 116 of the drum 110 and the second selected material larger than the size of the opening 116 of the drum 110 by the rotation of the drum 110.

The first selected material passes through the opening 116 of the drum 110, and falls toward the first web forming section 45 (see FIG. 1) located below the drum 110. The second selected material does not pass through the opening 116 of the drum 110, is flowed by the airflow flowing from the pipe 104 provided with the introduction port 102, and is discharged from the pipe 105 provided with the discharge port 103.

In this way, the defibrated material is sieved by the drum 110, and the first selected material smaller than the opening 116 falls below the drum 110. Further, the second selected material larger than the opening 116 flows from the introduction port 102 toward the discharge port 103 and is discharged from the pipe 105 provided with the discharge port 103.

When the second selected material flows from the introduction port 102 toward the discharge port 103, a force from the introduction port 102 toward the discharge port 103 (force in the +X direction) acts on the drum 110 by the second selected material flowing from the introduction port 102 toward the discharge port 103.

Since the drum 110 is only placed on the bearing 132, when a force in the +X direction acts on the drum 110 for a long time, the drum 110 may move in the +X direction and the drum 110 may come into contact with the housing 130B on the discharge port side.

Further, due to the maintenance of the fiber processing device 100, the drum 110 may move in the −X direction, and the drum 110 may come into contact with the housing 130A on the introduction port side. For example, when an extra force acts to adjust the position of the drum 110, the drum 110 may move in the −X direction, and the drum 110 may come into contact with the housing 130A on the introduction port side.

However, when the drum 110 comes into contact with the housing 130 (housing 130A on the introduction port side and the housing 130B on the discharge port side), the drum 110 is worn and the drum 110 deteriorates because the main constituent material of the drum 110 is aluminum and the constituent material of the housing 130 is stainless steel or iron.

Further, as the deterioration of the drum 110 progresses, a repair of replacing the drum 110 is required. In the repair of replacing the drum 110, in addition to incurring a large amount of cost, the fiber body manufacturing apparatus 1 is stopped for a long time, and the productivity of the fiber body manufacturing apparatus 1 is significantly reduced.

1.3 Outline of Displacement Suppressing Mechanism

In the present embodiment, a displacement suppressing mechanism 140 is provided to prevent the deterioration of the drum 110.

Figure 4:
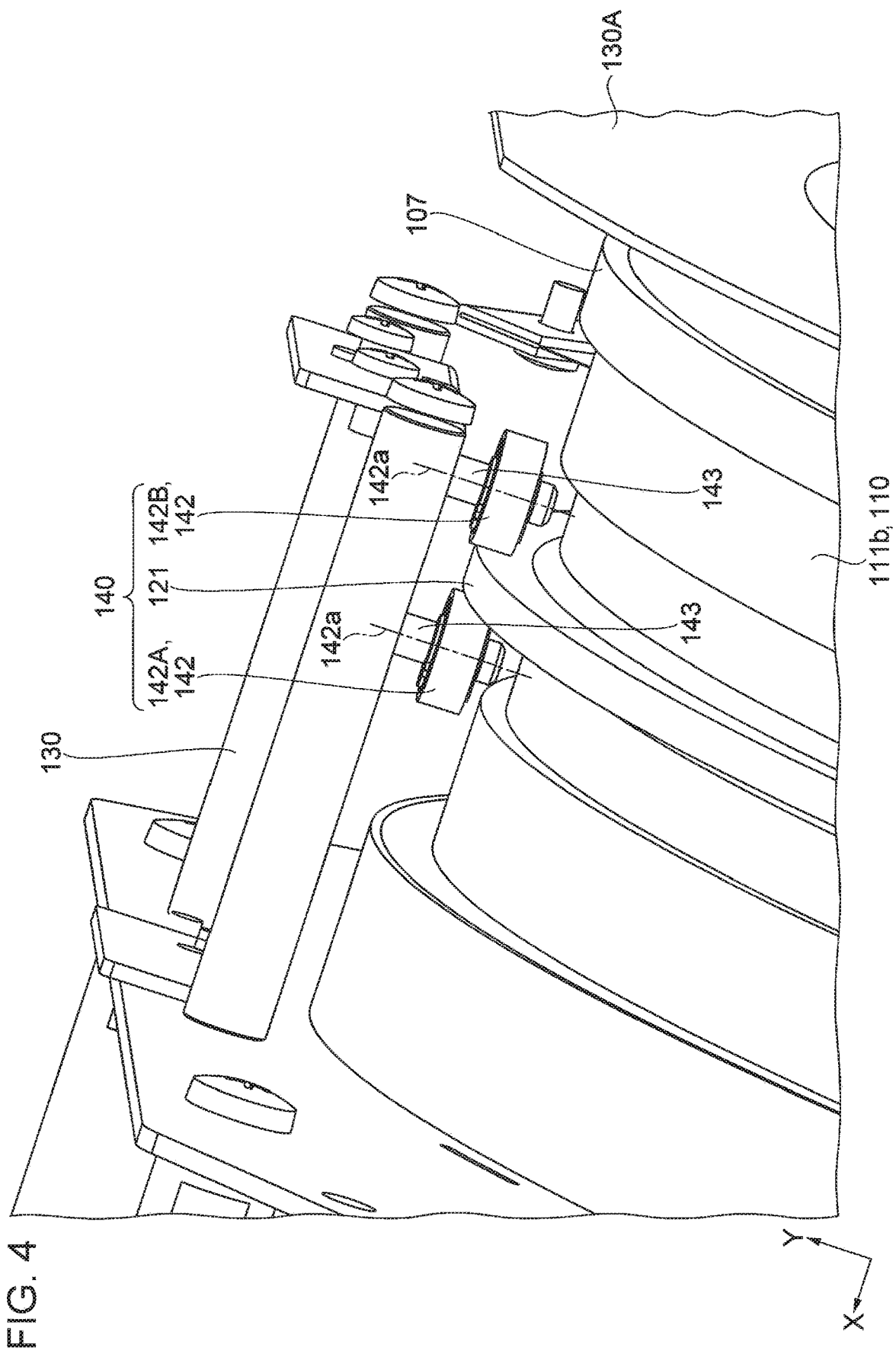
FIG. 4 is a perspective view illustrating an outline of a displacement suppressing mechanism.
Figure 5:
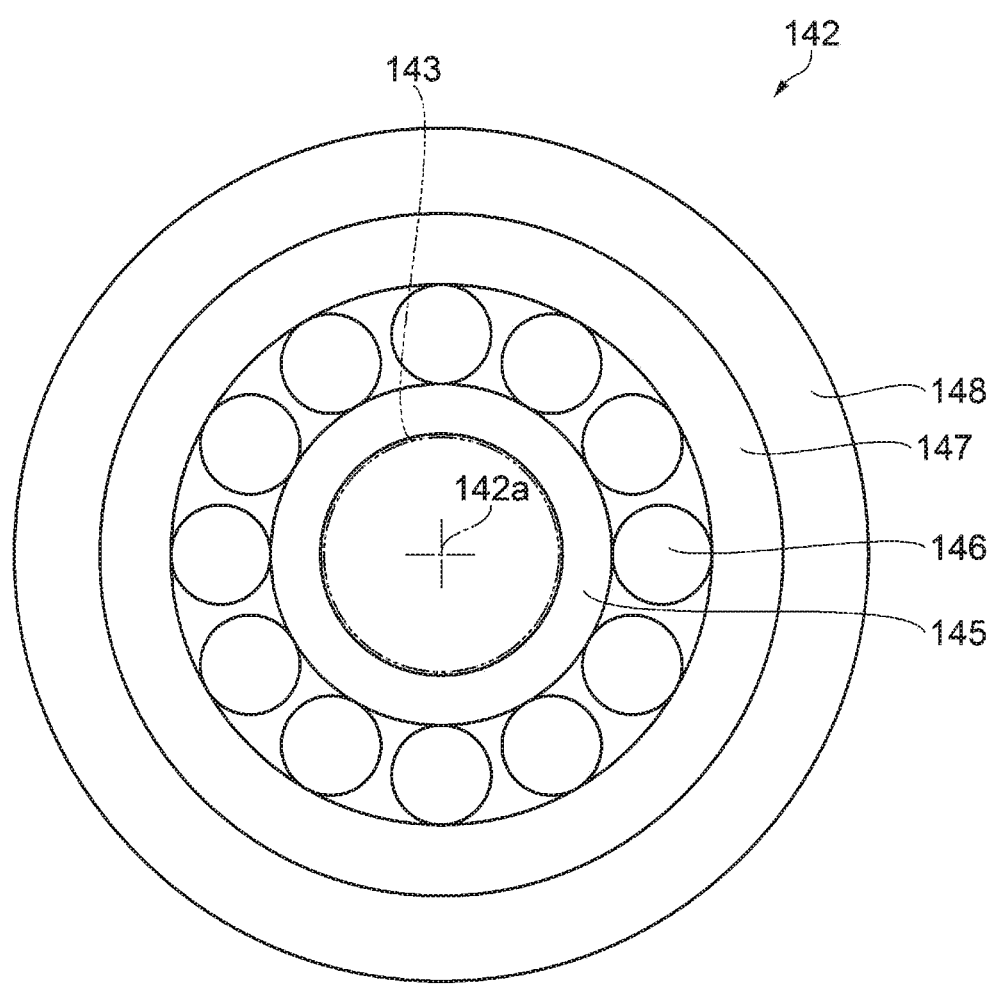
FIG. 5 is a plan view illustrating a state of a bearing.

FIG. 4 is an enlarged view of the region IV surrounded by the broken line in FIG. 2, and is a perspective view illustrating an outline of the displacement suppressing mechanism 140. FIG. 5 is a plan view illustrating a state of the bearing 142. FIG. 6 is a schematic diagram of the fiber processing device 100 according to the present embodiment having the displacement suppressing mechanism 140. In addition, FIGS. 4 and 6 are diagrams in which gaps are provided both between the drum 110 and the housing 130A on the introduction port side and between the drum 110 and the housing 130B on the discharge port side.

Next, an outline of the displacement suppressing mechanism 140 will be described with reference to FIGS. 4 to 6.

As illustrated in FIG. 4, the displacement suppressing mechanism 140 has the convex portion 121 provided on the outer peripheral surface 111b of the drum 110, and two bearings 142. The two bearings 142 are fixed to the housing 130 via shaft members 143 extending in the Y direction, respectively. That is, the two bearings 142 are provided in the housing 130. The bearing 142 disposed in the +X direction out of the two bearings 142 is a bearing 142A, and the bearing 142 disposed in the −X direction out of the two bearings 142 is a bearing 142B. The bearing 142A and the bearing 142B are arranged to face each other so as to sandwich the convex portion 121.

The convex portion 121 provided on the outer peripheral surface 111b of the drum 110 is an example of the guide portion in the present application. The bearing 142 is an example of the restriction portion in the present application. Further, the bearing 142, which is an example of the restriction portion, is configured to be provided in the housing 130.

As illustrated in FIG. 5, the bearing 142 is a rolling bearing including an inner ring 145, rolling elements 146, an outer ring 147, and a cage (not illustrated). Each of the shaft members 143 is disposed inside the inner ring 145 of the bearing 142, supports the inner ring 145 of the bearing 142, and is fixed to the housing 130. In the bearing 142, the rolling elements 146 are arranged between the inner ring 145 and the outer ring 147, and are held by a cage so as not to contact each other. The rolling elements 146 revolve while rolling between the inner ring 145 and the outer ring 147 while maintaining a constant distance.

With such a configuration, the bearing 142 is fixed to the housing 130 via the shaft member 143 and can rotate about the rotation axis 142a.

The rotation axis 142a of the bearing 142 is disposed at the center of the shaft member 143. The rotation axis 142a of the bearing 142 is parallel to the Y direction in which the shaft member 143 extends. Then, each of the two bearings 142 can rotate about the rotation axis 142a that is parallel to the Y direction.

Further, the outer ring 147 of the bearing 142 is covered with a protection member 148. The protection member 148 is made of a material having a hardness lower than that of the convex portion 121 (aluminum). For example, the constituent material of the protection member 148 is resin.

In this way, the outer ring 147 of the bearing 142 is covered with a material having a hardness lower than that of the convex portion 121.

Next, the configuration of the fiber processing device 100 will be briefly described with reference to FIG. 6.

As illustrated in FIG. 6, in the fiber processing device 100, the housing 130A on the introduction port side, the drum 110, and the housing 130B on the discharge port side are arranged in order along the +X direction. A gap is formed between the drum 110 and the housing 130A on the introduction port side, and a gap is formed between the drum 110 and the housing 130B on the discharge port side.

The drum 110 is placed on the bearing 132 that rotates about the rotation axis 132a, and the rotation axis 110a of the drum 110 and the rotation axis 132a of the bearing 132 are parallel to each other and extend in the X direction.

Further, when an unnecessary force acts on the drum 110, the drum 110 can move in the X direction.

The fiber processing device 100 is provided with the displacement suppressing mechanism 140.

The displacement suppressing mechanism 140 has two bearings 142 (bearings 142A and 142B) that are examples of a restriction portion and the convex portion 121 that is an example of the guide portion. The bearing 142 is fixed to the housing 130, and the position of the bearing 142 in the X direction does not change. The bearing 142 can rotate about the rotation axis 142a extending in the Y direction. The rotation axis 142a of the bearing 142 and the rotation axis 110a of the drum 110 are orthogonal to each other. That is, the bearing 142, which is an example of the restriction portion, can rotate about the rotation axis 142a orthogonal to the rotation axis 110a of the drum 110.

In this way, the present embodiment has a configuration in which the bearing 142, which is an example of the restriction portion, can rotate about an axis (rotation axis 142a) orthogonal to the rotation axis 110a.

The convex portion 121, which is an example of the guide portion, is provided on the outer peripheral surface 111b of the drum 110 and protrudes outward from the outer peripheral surface 111b of the drum 110. The drum 110 and the convex portion 121 are fixed to each other, and the position of the drum 110 in the X direction is controlled by the position of the convex portion 121 in the X direction.

In FIG. 6, a surface S1 orthogonal to the rotation axis 110a is illustrated by a two-dot chain line.

The convex portion 121 is disposed parallel to the surface S1 orthogonal to the rotation axis 110a. Strictly, the surface of the convex portion 121 coming in contact with the bearing 142 is parallel to the surface S1 orthogonal to the rotation axis 110a. Therefore, even though the convex portion 121 rotates about the rotation axis 110a together with the drum 110, the position of the convex portion 121 in the X direction does not change.

When the drum 110 is disposed equidistant from the housing 130A on the introduction port side and the housing 130B on the discharge port side, that is, the gap between the drum 110 and the housing 130A on the introduction port side and the gap between the end 112 of the drum 110 and the housing 130B on the discharge port side have the same size, the bearings 142A and 142B are arranged apart from the convex portion 121, and the bearings 142A and 142B each are arranged equidistant from the convex portion 121.

Further, when the drum 110 is disposed equidistant from the housing 130A on the introduction port side and the housing 130B on the discharge port side, the dimensions in the X direction of the gaps between the bearings 142A and 142B and the convex portion 121 are shorter than the dimension in the X direction of the gap between the drum 110 and the housing 130A on the introduction port side and are shorter than the dimension in the X direction of the gap between the drum 110 and the housing 130B on the discharge port side. That is, when the drum 110 is disposed equidistant from the housing 130A on the introduction port side and the housing 130B on the discharge port side, the separation distances between the bearings 142A and 142B and the convex portion 121 in the X direction are shorter than the separation distances between the housings 130A and 130B and the drum 110 in the X direction.

In a case where the displacement suppressing mechanism 140 has such a configuration, when the drum 110 tries to move in the +X direction due to the unnecessary force, the convex portion 121 comes into contact with the bearing 142A, the movement of the convex portion 121 (drum 110) in the +X direction is restricted by the bearing 142A, and the drum 110 does not come into contact with the housing 130B on the discharge port side. Accordingly, the contact between the drum 110 and the housing 130B on the discharge port side (friction between the drum 110 and the housing 130B on the discharge port side) is reduced.

Further, when the drum 110 tries to move in the −X direction due to the unnecessary force, the convex portion 121 comes into contact with the bearing 142B, the movement of the convex portion 121 (drum 110) in the −X direction is restricted by the bearing 142B, and the drum 110 does not come into contact with the housing 130A on the introduction port side. Accordingly, the contact between the drum 110 and the housing 130A on the introduction port side (friction between the drum 110 and the housing 130A on the introduction port side) is reduced.

When the convex portion 121 comes into contact with the bearing 142, the rotational force of the convex portion 121 rotating about the rotation axis 110a is transmitted to the bearing 142, so that the bearing 142 rotates about the rotation axis 142a. Thereby, at the portion where the bearing 142 and the convex portion 121 contact, wear due to sliding is less likely to occur on both the bearing 142 and the convex portion 121, and both the bearing 142 and the convex portion 121 are less likely to deteriorate.

That is, when the bearing 142, which is an example of the restriction portion that restricts the movement of the convex portion 121 in the X direction, can rotate about the rotation axis 142a, as compared with the case where the restriction portion that restricts the movement of the convex portion 121 in the X direction does not rotate, wear due to sliding is less likely to occur on both the bearing 142 and the convex portion 121, both the bearing 142 and the convex portion 121 are less likely to deteriorate, and the drum 110 is less likely to deteriorate.

Further, in the displacement suppressing mechanism 140, the outer ring 147 of the bearing 142 is covered with the protection member 148 having a hardness lower than that of the convex portion 121, and when the drum 110 tries to move in the X direction due to the unnecessary force, the protection member 148 having a low hardness comes into contact with the convex portion 121. Accordingly, as compared with the case where a material having a high hardness comes into contact with the convex portion 121, mechanical damage is less likely to occur in the convex portion 121 (drum 110), and the life of the drum 110 is extended.

Even though mechanical damage occurs in the protection member 148 having a low hardness due to contact with the convex portion 121, the bearing having the protection member 148 with a low hardness can be restored to a normal state by replacing the bearing 142. Replacing the bearing 142 is easier than replacing the drum 110, and the bearing 142 can be replaced at low cost and in a short time. That is, it is possible to suppress a large amount of cost incurred when the drum 110 is replaced and a problem that the fiber body manufacturing apparatus 1 is stopped for a long time.

2. Embodiment 2

Figure 7:
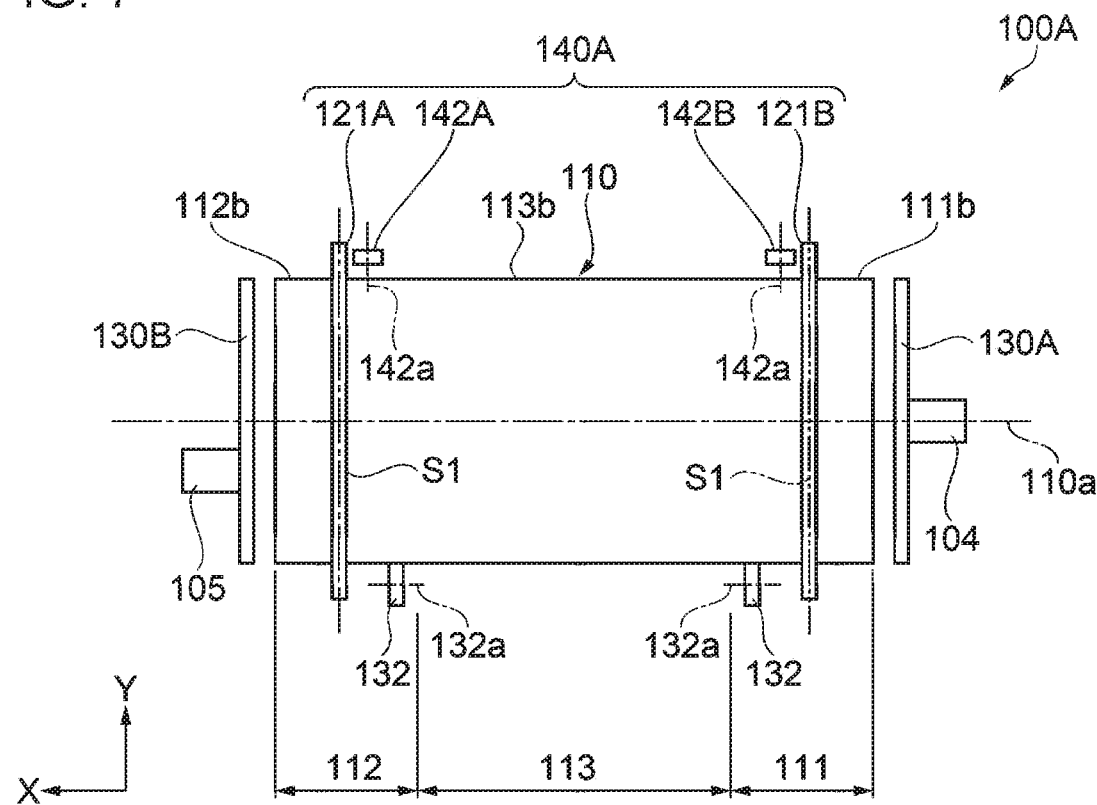
FIG. 7 is a schematic diagram of a fiber processing device according to Embodiment 2.

FIG. 7 is a diagram corresponding to FIG. 6, and is a schematic diagram of a fiber processing device 100A according to Embodiment 2.

The displacement suppressing mechanism 140 in Embodiment 1 includes two bearings 142A and 142B and one convex portion 121. A displacement suppressing mechanism 140A in Embodiment 2 includes two bearings 142A and 142B and two convex portions 121A and 121B. This point is a main difference between Embodiment 2 and Embodiment 1.

Hereinafter, with reference to FIG. 7, an outline of the fiber processing device 100A according to the present embodiment will be described focusing on differences from Embodiment 1. In addition, the same components as those of Embodiment 1 are denoted by the same reference numerals, and the duplicated description will be omitted.

The configuration of the displacement suppressing mechanism is different between the fiber processing device 100A (fiber body manufacturing apparatus) according to the present embodiment and the fiber processing device 100 (fiber body manufacturing apparatus 1) according to Embodiment 1, and the other configurations are the same.

As illustrated in FIG. 7, the displacement suppressing mechanism 140A in Embodiment 2 has the convex portion 121B provided on the outer peripheral surface 111b of the drum 110 (end 111), the convex portion 121A provided on the outer peripheral surface 112b of the drum 110 (end 112), and the bearings 142A and 142B fixed to the housing 130.

The outer peripheral surfaces 111b and 112b of the drum 110 is examples of the outer peripheral surface in the present application. The convex portions 121A and 121B provided on the outer peripheral surfaces 111b and 112b of the drum 110 are an example of the guide portion in the present application, and protrude outward from the outer peripheral surfaces 111b and 112b. The bearings 142A and 142B are examples of the restriction portion in the present application, and have the same configuration as that of Embodiment 1.

The bearing 142A is disposed in the −X direction with respect to the convex portion 121A so as to face the convex portion 121A. The bearing 142B is disposed in the +X direction with respect to the convex portion 121B so as to face the convex portion 121B.

When the drum 110 is disposed equidistant from the housing 130A on the introduction port side and the housing 130B on the discharge port side, the bearing 142A is disposed apart from the convex portion 121A, and the bearing 142B is disposed apart from the convex portion 121B. Further, when the drum 110 is disposed equidistant from the housing 130A on the introduction port side and the housing 130B on the discharge port side, the separation distance between the convex portion 121A and the bearing 142A in the X direction and the separation distance between the convex portion 121B and the bearing 142B in the X direction are shorter than the separation distances between the housings 130A and 130B and the drum 110 in the X direction.

In a case where the displacement suppressing mechanism 140A has such a configuration, when the drum 110 tries to move in the +X direction due to the unnecessary force, the convex portion 121B comes into contact with the bearing 142B, the movement of the convex portion 121B (drum 110) in the +X direction is restricted by the bearing 142B, and the drum 110 does not come into contact with the housing 130B on the discharge port side. Accordingly, the contact between the drum 110 and the housing 130B on the discharge port side (friction between the drum 110 and the housing 130B on the discharge port side) is reduced.

Further, when the drum 110 tries to move in the −X direction due to the unnecessary force, the convex portion 121A comes into contact with the bearing 142A, the movement of the convex portion 121A (drum 110) in the −X direction is restricted by the bearing 142A, and the drum 110 does not come into contact with the housing 130A on the introduction port side. Accordingly, the contact between the drum 110 and the housing 130A on the introduction port side (friction between the drum 110 and the 130A on the introduction port side) is reduced.

Further, in addition to the effect that the contact between the drum 110 and the housing 130 is reduced, the displacement suppressing mechanism 140A in Embodiment 2 can achieve the same effect as the displacement suppressing mechanism 140 in the above-described Embodiment 1 (for example, suppression of deterioration of the bearing 142, reduction of friction of the drum 110, and the like).

3. Embodiment 3

Figure 8:
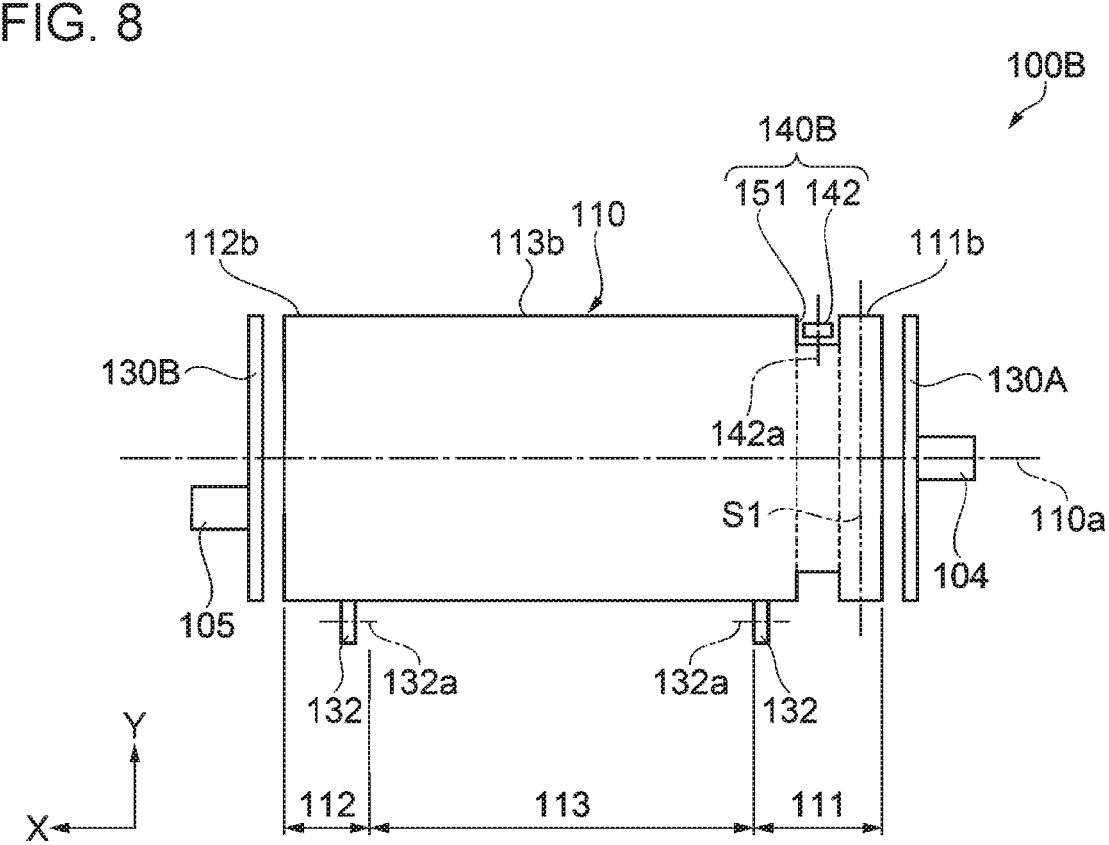
FIG. 8 is a schematic diagram of a fiber processing device according to Embodiment 3.

FIG. 8 is a diagram corresponding to FIG. 6, and is a schematic diagram of a fiber processing device 100B according to Embodiment 3. In FIG. 8, a contour of a concave portion 151 provided in the drum 110 is illustrated by a broken line.

The displacement suppressing mechanism 140 in Embodiment 1 includes two bearings 142A and 142B and one convex portion 121. The displacement suppressing mechanism 140B in Embodiment 3 includes one bearing 142 and one concave portion 151. This point is a main difference between Embodiment 3 and Embodiment 1.

Hereinafter, with reference to FIG. 8, an outline of the fiber processing device 100B according to the present embodiment will be described focusing on differences from Embodiment 1. In addition, the same components as those of Embodiment 1 are denoted by the same reference numerals, and the duplicated description will be omitted.

The configuration of the displacement suppressing mechanism is different between the fiber processing device 100B (fiber body manufacturing apparatus) according to the present embodiment and the fiber processing device 100 (fiber body manufacturing apparatus 1) according to Embodiment 1, and the other configurations are the same.

As illustrated in FIG. 8, the displacement suppressing mechanism 140B in Embodiment 3 has the concave portion 151 provided on the outer peripheral surface 111b of the drum 110, and the bearing 142 fixed to the housing 130. The concave portion 151 provided on the outer peripheral surface 111b of the drum 110 is a groove recessed inward from the outer peripheral surface 111b. The bearing 142 can rotate about the rotation axis 142a orthogonal to the rotation axis 110a of the drum 110.

The concave portion 151 provided on the outer peripheral surface 111b of the drum 110 is an example of the guide portion in the present application. The bearing 142 is disposed inside the groove (concave portion 151) recessed inward from the outer peripheral surface 111b, and is an example of the restriction portion in the present application. In addition, the outer ring 147 of the bearing 142 is covered with a material (for example, resin) having a hardness lower than that of the wall surface of the groove forming the concave portion 151.

In FIG. 8, the surface S1 orthogonal to the rotation axis 110a is illustrated by a two-dot chain line.

The concave portion 151 is disposed parallel to the surface S1 orthogonal to the rotation axis 110a. Strictly, the wall surface of the concave portion 151 coming into contact with the bearing 142 is parallel to the surface S1 orthogonal to the rotation axis 110a. Therefore, even though the drum 110 and the concave portion 151 rotate about the rotation axis 110a, the positions of the drum 110 and the concave portion 151 in the X direction do not change.

When the drum 110 is disposed equidistant from the housing 130A on the introduction port side and the housing 130B on the discharge port side, the bearing 142 is disposed apart from the wall surface of the concave portion 151, and does not come into contact with the wall surface of the concave portion 151. Further, when the drum 110 is disposed equidistant from the housing 130A on the introduction port side and the housing 130B on the discharge port side, the separation distance between the wall surface of the concave portion 151 and the bearing 142 in the +X direction and the separation distance between the concave portion 151 and the bearing 142 in the −X direction are shorter than the separation distances between the housings 130A and 130B and the drum 110 in the X direction.

In a case where the displacement suppressing mechanism 140B has such a configuration, when the drum 110 tries to move in the +X direction due to the unnecessary force, the wall surface of the concave portion 151 comes into contact with the bearing 142, the movement of the concave portion 151 (drum 110) in the +X direction is restricted by the bearing 142, and the drum 110 does not come into contact with the housing 130B on the discharge port side. Accordingly, the contact between the drum 110 and the housing 130B on the discharge port side (friction between the drum 110 and the housing 130B on the discharge port side) is prevented.

Further, when the drum 110 tries to move in the −X direction due to the unnecessary force, the wall surface of the concave portion 151 comes into contact with the bearing 142, the movement of the concave portion 151 (drum 110) in the −X direction is restricted by the bearing 142, and the drum 110 does not come into contact with the housing 130A on the introduction port side. Accordingly, the contact between the drum 110 and the housing 130A on the introduction port side (friction between the drum 110 and the housing 130A on the introduction port side) is prevented.

Further, in addition to the effect that the friction between the drum 110 and the housing 130 is prevented, the displacement suppressing mechanism 140B in Embodiment 3 can achieve the same effect as the displacement suppressing mechanism 140 in the above-described Embodiment 1 (for example, suppression of deterioration of the bearing 142, reduction of friction of the drum 110, and the like).

4. Embodiment 4

Figure 9:
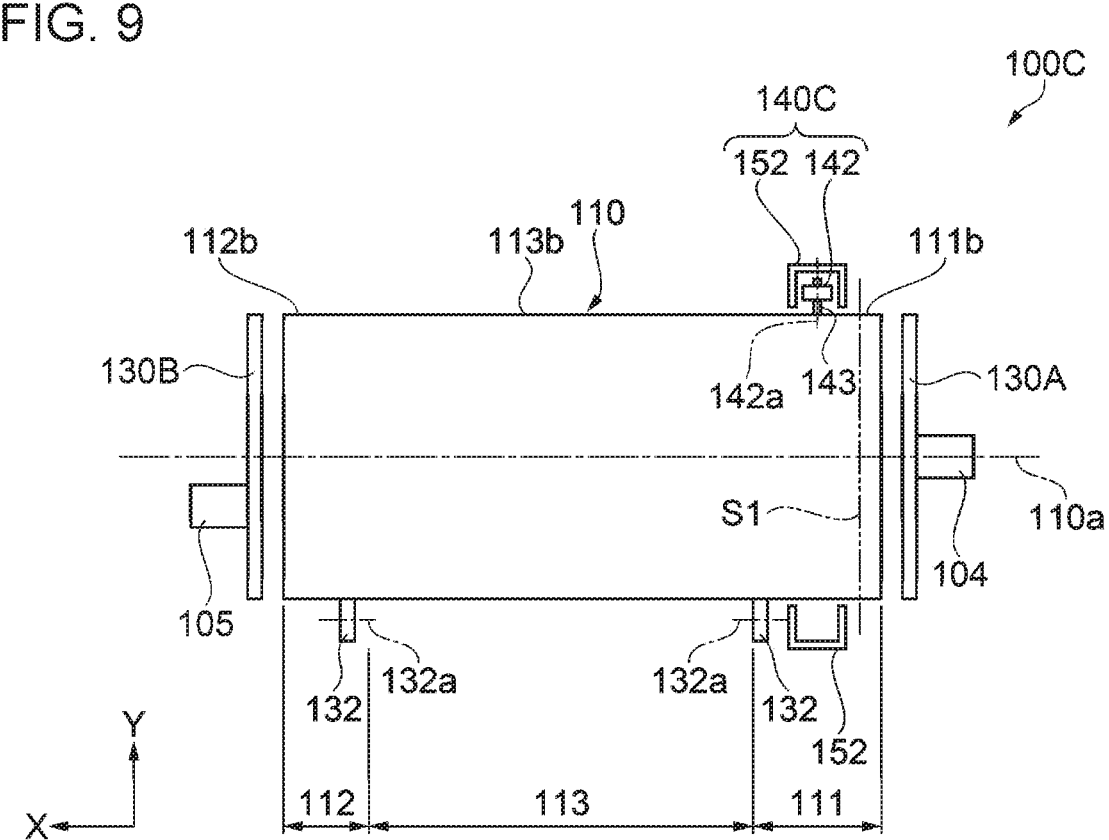
FIG. 9 is a schematic diagram of a fiber processing device according to Embodiment 4.

FIG. 9 is a diagram corresponding to FIG. 6, and is a schematic diagram of a fiber processing device 100C according to Embodiment 4.

The displacement suppressing mechanism 140 in Embodiment 1 includes two bearings 142A and 142B and one convex portion 121. The displacement suppressing mechanism 140C in Embodiment 4 includes one bearing 142 and one frame 152. Further, in Embodiment 1, the two bearings 142A and 142B are fixed to the housing 130. In Embodiment 4, one bearing 142 is fixed to the drum 110. These points are main differences between Embodiment 4 and Embodiment 1.

Hereinafter, with reference to FIG. 9, an outline of the fiber processing device 100C according to the present embodiment will be described focusing on differences from Embodiment 1. In addition, the same components as those of Embodiment 1 are denoted by the same reference numerals, and the duplicated description will be omitted.

The configuration of the displacement suppressing mechanism is different between the fiber processing device 100C (fiber body manufacturing apparatus) according to the present embodiment and the fiber processing device 100 (fiber body manufacturing apparatus 1) according to Embodiment 1, and the other configurations are the same.

As illustrated in FIG. 9, the displacement suppressing mechanism 140C in Embodiment 4 includes the bearing 142 provided on the outer peripheral surface 111b of the drum 110 (end 111), and the frame 152 fixed to the housing 130.

The bearing 142 fixed to the outer peripheral surface 111b of the drum 110 is an example of the guide portion in the present application. The frame 152 fixed to the housing 130 is an example of the restriction portion in the present application.

The bearing 142 has the same configuration as that of Embodiment 1, and is fixed to the drum 110 via the shaft member 143. The bearing 142 can rotate about the rotation axis 142a. The rotation axis 142a of the bearing 142 is parallel to the direction in which the shaft member 143 extends, and is orthogonal to the rotation axis 110a of the drum 110. Further, since the bearing 142 is fixed to the drum 110, the bearing 142 can rotate about the rotation axis 110a together with the drum 110. That is, the bearing 142 can rotate about the rotation axis 110a, and can rotate about the rotation axis 142a orthogonal to the rotation axis 110a.

In this way, the present embodiment has a configuration in which the bearing 142, which is an example of the guide portion, can rotate about an axis (rotation axis 142a) orthogonal to the rotation axis 110a.

When the frame 152 is viewed from a direction intersecting the X direction and the Y direction, the cross section of the frame 152 has a U shape as illustrated in FIG. 9. That is, the frame 152 is a member having a U-shaped cross section when viewed from a direction intersecting the X direction and the Y direction. The bearing 142 is disposed inside the U-shaped frame 152. As a result, the frame 152 is disposed on the −X direction side of the bearing 142 and on the +X direction side of the bearing 142, and restricts the movement of the bearing 142 in the X direction (−X direction and +X direction). In this way, the frame 152, which is an example of the restriction portion, is disposed in the direction of the rotation axis 110a (X direction) with respect to the bearing 142.

Further, the cross section of the frame 152 is circular when viewed from the X direction (direction of the rotation axis 110a). That is, the frame 152 is a member having a circular cross section when viewed from the X direction. Thereby, even though the bearing 142 rotates about the rotation axis 110a together with the drum 110, the bearing 142 is disposed inside the frame 152.

When the drum 110 is disposed equidistant from the housing 130A on the introduction port side and the housing 130B on the discharge port side, the bearing 142 is disposed apart from the wall surface of the frame 152, and the bearing 142 does not come into contact with the wall surface of the frame 152. Further, when the drum 110 is disposed equidistant from the housing 130A on the introduction port side and the housing 130B on the discharge port side, the separation distance between the bearing 142 and the wall surface of the frame 152 in the +X direction and the separation distance between the bearing 142 and the wall surface of the frame 152 in the −X direction are shorter than the separation distances between the housings 130A and 130B and the drum 110 in the X direction.

In a case where the displacement suppressing mechanism 140C has such a configuration, when the drum 110 tries to move in the +X direction due to the unnecessary force, the bearing 142 comes into contact with the wall surface of the frame 152, the movement of the bearing 142 (drum 110) in the +X direction is restricted by the frame 152, and the drum 110 does not come into contact with the housing 130B on the discharge port side. Accordingly, the contact between the drum 110 and the housing 130B on the discharge port side (friction between the drum 110 and the housing 130B on the discharge port side) is prevented.

Further, when the drum 110 tries to move in the −X direction due to the unnecessary force, the bearing 142 comes into contact with the wall surface of the frame 152, the movement of the bearing 142 (drum 110) in the −X direction is restricted by the frame 152, and the drum 110 does not come into contact with the housing 130A on the introduction port side. Accordingly, the contact between the drum 110 and the housing 130A on the introduction port side (friction between the drum 110 and the housing 130A on the introduction port side) is reduced.

Further, in addition to the effect that the contact between the drum 110 and the housing 130 is reduced, the displacement suppressing mechanism 140C in Embodiment 4 can achieve the same effect as the displacement suppressing mechanism 140 in the above-described Embodiment 1 (for example, suppression of deterioration of the bearing 142, reduction of friction of the drum 110, and the like).

5. Embodiment 5

Figure 10:
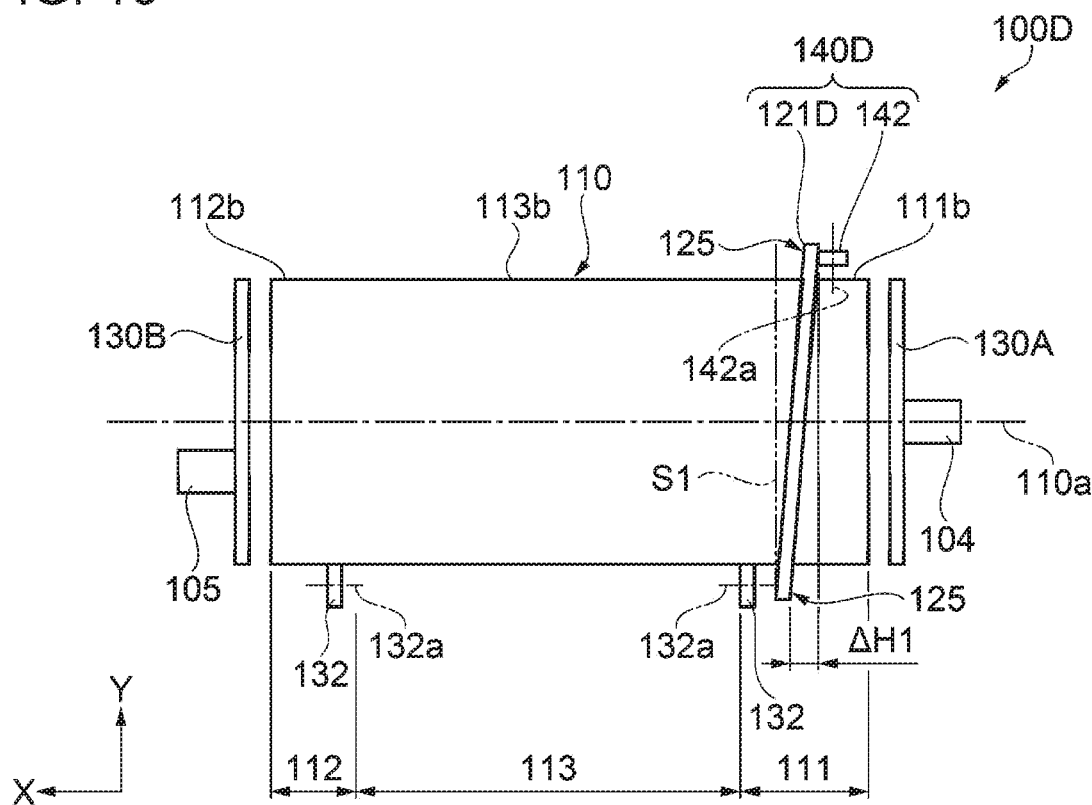
FIG. 10 is a schematic diagram of a fiber processing device according to Embodiment 5.

FIG. 10 is a diagram corresponding to FIG. 6, and is a schematic diagram of a fiber processing device 100D according to Embodiment 5.

The displacement suppressing mechanism 140 in Embodiment 1 includes two bearings 142A and 142B and one convex portion 121. A displacement suppressing mechanism 140D in Embodiment 5 includes one bearing 142 and one convex portion 121D. Further, the states of the convex portions are different between Embodiment 5 and Embodiment 1. These points are main differences between Embodiment 5 and Embodiment 1.

Hereinafter, with reference to FIG. 10, an outline of the fiber processing device 100D according to the present embodiment will be described focusing on differences from Embodiment 1. In addition, the same components as those of Embodiment 1 are denoted by the same reference numerals, and the duplicated description will be omitted.

The configuration of the displacement suppressing mechanism is different between the fiber processing device 100D (fiber body manufacturing apparatus) according to the present embodiment and the fiber processing device 100 (fiber body manufacturing apparatus 1) according to Embodiment 1, and the other configurations are the same.

As illustrated in FIG. 10, the displacement suppressing mechanism 140D in Embodiment 5 has the convex portion 121D provided on the outer peripheral surface 111b of the drum 110 (end 111), and the bearing 142 fixed to the housing 130. The bearing 142 is located in the −X direction with respect to the convex portion 121D.

The convex portion 121D provided on the outer peripheral surface 111b of the drum 110 is an example of the guide portion in the present application, and protrudes outward from the outer peripheral surface 111b. The bearing 142 fixed to the housing 130 is an example of the restriction portion in the present application, and has the same configuration as that of Embodiment 1.

The convex portion 121D has a contact portion 125 in contact with the bearing 142. Since the contact portion 125 is in contact with the bearing while rotating together with the drum 110, the contact portion 125 is disposed in the circumferential direction of the convex portion 121D, and the shape of the contact portion 125 when viewed from the X direction is circular.

The convex portion 121D intersects the surface S1 orthogonal to the rotation axis 110a. On the other hand, the convex portion 121 of Embodiment 1 is parallel to the surface S1 orthogonal to the rotation axis 110a. This point is a difference between the convex portion 121D of the present embodiment and the convex portion 121 of Embodiment 1.

In the present embodiment, a force in the −X direction always acts on the drum 110 by a biasing member (not illustrated) such as a spring. Therefore, the contact portion 125 of the convex portion 121D is pressed against the bearing 142, and the contact portion 125 of the convex portion 121D is in contact with the bearing 142.

On the other hand, in Embodiment 1, when the drum 110 is disposed equidistant from the housing 130A on the introduction port side and the housing 130B on the discharge port side, the convex portion 121 is separated from the bearing 142. This point is also a difference between the present embodiment and Embodiment 1.

The bearing 142 has the same configuration as that of Embodiment 1, and is fixed to the housing 130 via the shaft member 143. Therefore, the bearing 142 can rotate about the rotation axis 142a orthogonal to the rotation axis 110a of the drum 110, and the position of the bearing 142 in the X direction (direction of the rotation axis 110a) does not change.

The convex portion 121D can rotate about the rotation axis 110a together with the drum 110, and move in the X direction (direction of the rotation axis 110a) together with the drum 110. When the position of the contact portion 125 of the convex portion 121D in the X direction changes, the position of the drum 110 in the X direction changes.

With such a configuration, the convex portion 121D intersects the surface S1 orthogonal to the rotation axis 110a, so that when the convex portion 121D rotates about the rotation axis 110a together with the drum 110, the position of the contact portion 125 in contact with the bearing 142 changes in the X direction. In addition, when the drum 110 rotates once about the rotation axis 110a, the position of the contact portion 125 in the X direction changes by ΔH1, as illustrated in FIG. 10.

On the other hand, in Embodiment 1, since the convex portion 121 is parallel to the surface S1 orthogonal to the rotation axis 110a, even though the convex portion 121 rotates about the rotation axis 110a together with the drum 110, the position of the convex portion 121 coming into contact with the bearing 142 does not change in the X direction.

When the drum 110 rotates once about the rotation axis 110a while the convex portion 121D (contact portion 125) is pressed against the bearing 142, the position of the contact portion 125 in the X direction changes by ΔH1, so that the position of the drum 110 in the X direction changes ΔH1. Therefore, when the drum 110 rotates about the rotation axis 110a, the position of the drum 110 in the X direction periodically changes, and the drum 110 vibrates in the X direction.

In this way, in the present embodiment, when the drum 110 rotates while the convex portion 121D, which is an example of the guide portion, is pressed against the bearing 142, which is an example of the restriction portion, the position of the drum 110 in the direction of the rotation axis 110a (X direction) changes. Then, when the drum 110 rotates about the rotation axis 110a, the drum 110 vibrates in direction of the rotation axis 110a.

When the drum 110 vibrates in the X direction, the sieving performance of the drum 110 is improved as compared with the configuration in which the drum 110 does not vibrate in the X direction (for example, the configuration of Embodiment 1), and the defibrated material introduced into the drum 110 is properly selected into the first selected material and the second selected material.

That is, the fiber processing device 100D according to the present embodiment can achieve the effect that the sieving performance of the drum 110 is improved in addition to the effect achieved by the fiber processing device 100 according to Embodiment 1.

6. Embodiment 6

Figure 11:
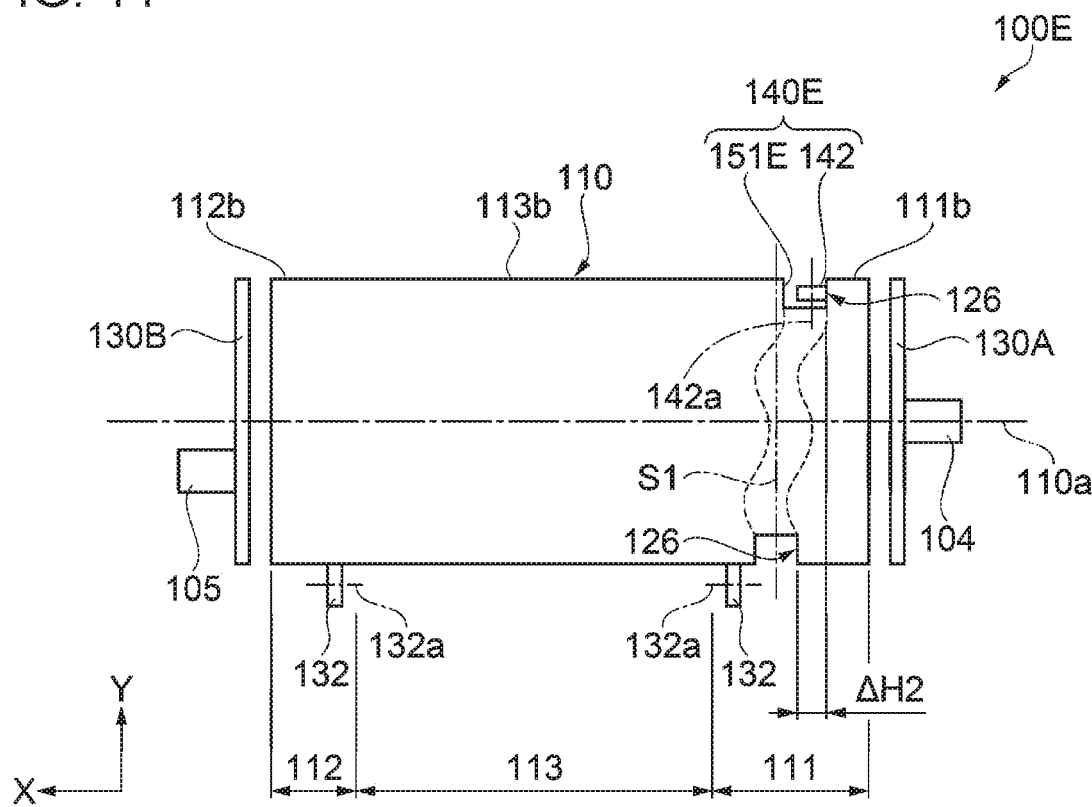
FIG. 11 is a schematic diagram of a fiber processing device according to Embodiment 6.
Figure 12:
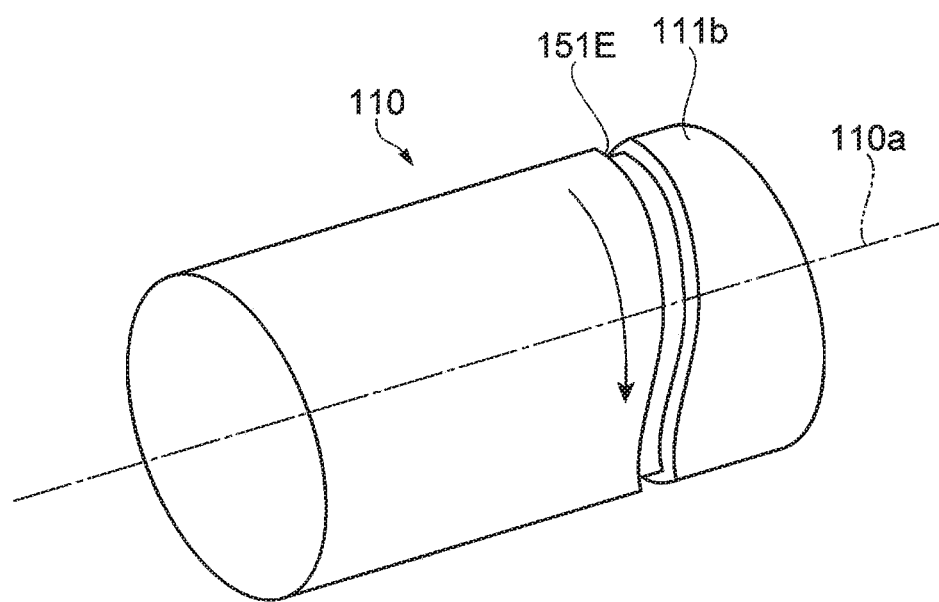
FIG. 12 is a perspective view of a drum included in the fiber processing device according to Embodiment 6.

FIG. 11 is a diagram corresponding to FIG. 6, and is a schematic diagram of a fiber processing device 100E according to Embodiment 6. FIG. 12 is a perspective view of the drum 110 included in the fiber processing device 100E according to the present embodiment. In FIG. 11, a contour of a concave portion 151E provided in the drum 110 is illustrated by a broken line. In addition, in FIG. 12, the rotation direction of the drum 110 is illustrated by a solid arrow.

The displacement suppressing mechanism 140B in Embodiment 3 includes one bearing 142 and one concave portion 151, a displacement suppressing mechanism 140E in Embodiment 6 includes one bearing 142 and one concave portion 151E, and thus the states of the concave portions are different between Embodiment 6 and Embodiment 3. This point is a main difference between Embodiment 6 and Embodiment 3.

Hereinafter, with reference to FIGS. 11 and 12, an outline of the fiber processing device 100E according to the present embodiment will be described focusing on differences from Embodiment 3. In addition, the same components as those of Embodiment 3 are denoted by the same reference numerals, and the duplicated description will be omitted.

The configuration of the displacement suppressing mechanism is different between the fiber processing device 100E (fiber body manufacturing apparatus) according to the present embodiment and the fiber processing device 100B (fiber body manufacturing apparatus) according to Embodiment 3, and the other configurations are the same.

As illustrated in FIG. 11, the displacement suppressing mechanism 140E in Embodiment 6 has the concave portion 151E provided on the outer peripheral surface 111b of the drum 110 (end 111), and the bearing 142 fixed to the housing 130. The bearing 142 is disposed inside the concave portion 151E.

The concave portion 151E provided on the outer peripheral surface 111b of the drum 110 is a groove recessed inward from the outer peripheral surface 111b, and is an example of the guide portion in the present application. The bearing 142 is disposed inside the groove (concave portion 151E) recessed inward from the outer peripheral surface 111b, and is an example of the restriction portion in the present application.

The concave portion 151E intersects the surface S1 orthogonal to the rotation axis 110a. Specifically, the wall surface of the concave portion 151E in contact with the bearing 142 intersects the surface S1 orthogonal to the rotation axis 110a. On the other hand, the concave portion 151 of Embodiment 3 is parallel to the surface S1 orthogonal to the rotation axis 110a. This point is a difference between the concave portion 151E of the present embodiment and the concave portion 151 of Embodiment 3.

In the present embodiment, a force in the +X direction always acts on the drum 110 by a biasing member (not illustrated) such as a spring. Therefore, the wall surface of the concave portion 151E is pressed against the bearing 142, and the wall surface of the concave portion 151E is in contact with the bearing 142. Hereinafter, the portion of the concave portion 151E in contact with the bearing 142 will be referred to as a contact portion 126.

On the other hand, in Embodiment 3, when the drum 110 is disposed equidistant from the housing 130A on the introduction port side and the housing 130B on the discharge port side, the wall surface of the concave portion 151 is separated from the bearing 142. This point is also a difference between the present embodiment and Embodiment 3.

The bearing 142 has the same configuration as that of Embodiment 3, and is fixed to the housing 130 via the shaft member 143. Therefore, the bearing 142 can rotate about the rotation axis 142a orthogonal to the rotation axis 110a of the drum 110, and the position of the bearing 142 in the X direction (direction of the rotation axis 110a) does not change.

The concave portion 151E can rotate about the rotation axis 110a together with the drum 110, and move in the X direction (direction of the rotation axis 110a) together with the drum 110. When the position of the contact portion 126 of the concave portion 151E in the X direction changes, the position of the drum 110 in the X direction changes.

With such a configuration, the concave portion 151E intersects the surface S1 orthogonal to the rotation axis 110a, so that when the concave portion 151E rotates about the rotation axis 110a together with the drum 110, the position of the contact portion 126 in contact with the bearing 142 changes in the X direction. In addition, when the drum 110 rotates once about the rotation axis 110a, the position of the contact portion 126 in the X direction changes by ΔH2, as illustrated in FIG. 11.

On the other hand, in Embodiment 3, since the concave portion 151 is parallel to the surface S1 orthogonal to the rotation axis 110a, even though the concave portion 151 rotates about the rotation axis 110a together with the drum 110, the position of the concave portion 151 coming into contact with the bearing 142 does not change in the X direction.

When the drum 110 rotates once about the rotation axis 110a while the concave portion 151E (contact portion 126) is pressed against the bearing 142, the position of the contact portion 126 in the X direction changes by ΔH2, so that the position of the drum 110 in the X direction changes ΔH2. Therefore, when the drum 110 rotates about the rotation axis 110a, the position of the drum 110 in the X direction periodically changes, and the drum 110 vibrates in the X direction.

In this way, in the present embodiment, when the drum 110 rotates while the concave portion 151E, which is an example of the guide portion, is pressed against the bearing 142, which is an example of the restriction portion, the position of the drum 110 in the direction of the rotation axis 110a (X direction) changes. Then, when the drum 110 rotates about the rotation axis 110a, the drum 110 vibrates in direction of the rotation axis 110a.

Further, as illustrated by the broken line in FIG. 11 and FIG. 12, the concave portion 151E provided in the drum 110 meanders in the rotation direction of the drum 110 indicated by the solid arrow in the drawing.

In a case where the concave portion 151E does not meander in the rotation direction of the drum 110, when the drum 110 rotates once about the rotation axis 110a, the drum 110 vibrates once in the X direction. In a case where the concave portion 151E meanders in the rotation direction of the drum 110, when the drum 110 rotates once about the rotation axis 110a, the drum 110 vibrates multiple times in the X direction (+X direction and −X direction).

That is, in a case where the concave portion 151E meanders in the rotation direction of the drum 110, as compared with the configuration in which the concave portion 151E does not meander in the rotation direction of the drum 110, the vibration frequency of the drum 110 increases when the rotation speed of the drum 110 is the same, and the drum 110 quickly vibrates in the X direction.

In this way, in the present embodiment, the drum 110 vibrates more quickly in the X direction than in Embodiment 5. When the drum 110 quickly vibrates in the X direction, the sieving performance of the drum 110 is further improved, and the defibrated material introduced into the drum 110 is more properly selected into the first selected material and the second selected material.

That is, the fiber processing device 100E according to the present embodiment can achieve the effect that the sieving performance of the drum 110 is improved in addition to the effect achieved by the fiber processing device 100B according to Embodiment 3 (effect achieved by the fiber processing device 100 according to Embodiment 1). Further, the fiber processing device 100E according to the present embodiment can achieve the effect that the sieving performance of the drum 110 is further improved as compared with the fiber processing device 100D according to Embodiment 5.

7. Modification Example 1

In Embodiments 1 to 3, the bearing 142, which is an example of the restriction portion, rotates about the rotation axis 142a orthogonal to the rotation axis 110a, and the guide portion does not rotate. In Embodiment 4, the bearing 142, which is an example of the guide portion, rotates about the rotation axis 142a orthogonal to the rotation axis 110a, and the restriction portion does not rotate. In this way, Embodiments 1 to 4 have a configuration in which either the restriction portion or the guide portion can rotate about an axis orthogonal to the rotation axis.

The present disclosure is not limited to the configuration in which either the restriction portion or the guide portion can rotate about the axis orthogonal to the rotation axis, both the restriction portion and the guide portion may be configured to be rotatable about an axis orthogonal to the rotation axis. That is, at least one of the restriction portion and the guide portion may be configured to be rotatable about an axis orthogonal to the rotation axis.

8. Modification Example 2

The accumulating section 60 including the drum 61 and the housing 63 has the same configuration as the fiber processing device 100 including the drum 110 and the housing 130.

The displacement suppressing mechanism 140, 140A, 140B, 140C, 140D, or 140E is not limited to the configuration provided in the fiber processing device 100, and the displacement suppressing mechanism 140, 140A, 140B, 140C, 140D, or 140E may be provided in the accumulating section 60.

9. Modification Example 3

In Embodiment 1, the restriction portion that restricts the movement of the drum 110 (convex portion 121) in the X direction was the bearing 142 that can rotate about the rotation axis 142a orthogonal to the rotation axis 110a. The present disclosure is not limited to the configuration in which the restriction portion that restricts the movement of the drum 110 in the X direction can rotate about the axis (rotation axis 142a) orthogonal to the rotation axis (rotation axis 110a), and may have a configuration in which the restriction portion does not rotate.

For example, a ring-shaped member having a hardness lower than that of the drum 110 is disposed between the drum 110 and the housing 130A on the introduction port side, and between the end 112 of the drum 110 and the housing 130B on the discharge port side, and when the drum 110 moves in the X direction due to an unnecessary force, the end of the drum 110 in the X direction may be brought into contact with the ring-shaped member. Also with such a configuration, deterioration (wear) of the drum 110 can be suppressed.

When the restriction portion that restricts the movement of the drum 110 in the X direction does not rotate, the restriction portion is preferably made of a material having excellent wear resistance and a low friction coefficient, in addition to the material having a hardness lower than that of the drum 110.

The contents derived from the embodiment are described below.

A fiber processing device includes a drum having a plurality of openings on an outer periphery, sieving a raw material containing fibers, and configured to rotate about a rotation axis, a housing that supports the drum, a guide portion provided on an outer peripheral surface of the drum, and a restriction portion that restricts movement of the drum in the direction of the rotation axis by contacting the guide portion. At least one of the restriction portion and the guide portion is configured to rotate about an axis orthogonal to the rotation axis.

Since the movement of the drum in the direction of the rotation axis is restricted by the contact between the guide portion and the restriction portion, the drum is less likely to come into contact with other members such as the housing, except the portion where the guide portion and the restriction portion contact. Accordingly, the contact between the drum and the housing can be reduced. Further, at the portion where the guide portion and the restriction portion contact, at least one of the restriction portion and the guide portion can rotate about an axis orthogonal to the rotation axis, so that wear due to sliding is less likely to occur in the drum.

In this way, since the contact between the drum and the housing is less likely to occur, the friction between the drum and the housing can be reduced.

In the fiber processing device, the restriction portion may be provided in the housing.

When the restriction portion is provided on the housing, the structure is simpler than when the restriction portion is provided on a member other than the housing, and it is not necessary to provide an extra member.

In the fiber processing device, the guide portion may be a convex portion protruding outward from the outer peripheral surface, and the restriction portion may be a bearing configured to rotate about the axis orthogonal to the rotation axis.

When the guide portion is a convex portion that protrudes outward from the outer peripheral surface and the restriction portion is a bearing that can rotate about an axis orthogonal to the rotation axis, at the portion where the guide portion and the restriction portion contact, the restriction portion rotates about the axis orthogonal to the rotation axis. Accordingly, as compared with the case where the restriction portion does not rotate, wear due to sliding is less likely to occur, and the drum is less likely to deteriorate.

In the fiber processing device, an outer ring of the bearing may be covered with a material having a hardness lower than a hardness of the convex portion.

When the outer ring of the bearing is covered with a material having a hardness lower than that of the convex portion, at the portion where the guide portion and the restriction portion contact, the material having a low hardness comes into contact with the convex portion (drum). Accordingly, as compared with the case where the material having a high hardness comes into contact with the convex portion (drum), wear is less likely to occur in the convex portion (drum), and the drum is less likely to deteriorate.

In the fiber processing device, the guide portion may be a groove recessed inward from the outer peripheral surface, and the restriction portion may be a bearing that is disposed inside the groove and configured to rotate about the axis orthogonal to the rotation axis.

When the guide portion is a groove (concave portion) recessed inward from the outer peripheral surface and the restriction portion is a bearing that can rotate about an axis orthogonal to the rotation axis, at the portion where the guide portion and the restriction portion contact, the restriction portion rotates about the axis orthogonal to the rotation axis. Accordingly, as compared with the case where the restriction portion does not rotate, wear due to sliding is less likely to occur, and the drum is less likely to deteriorate.

In the fiber processing device, an outer ring of the bearing may be covered with a material having a hardness lower than a hardness of a wall surface of the groove.

When the outer ring of the bearing is covered with a material having a hardness lower than that of the wall surface of the groove, at the portion where the guide portion and the restriction portion contact, the material having a low hardness comes into contact with the concave portion (wall surface of the groove). Accordingly, as compared with the case where the material having a high hardness comes into contact with the concave portion, wear is less likely to occur in the concave portion (drum), and the drum is less likely to deteriorate.

In the fiber processing device, the guide portion may be a bearing configured to rotate about the axis orthogonal to the rotation axis, and the restriction portion may be a frame disposed in the direction of the rotation axis with respect to the bearing.

When the guide portion is a bearing that can rotate about an axis that is orthogonal to the rotation axis and the restriction portion is a frame disposed in the direction of the rotation axis with respect to the bearing, the movement of the drum in the direction of the rotation axis is restricted by the restriction portion coming into contact with the guide portion. At the portion where the guide portion and the restriction portion contact, due to the rotation of the guide portion about the axis orthogonal to the rotation axis, wear due to sliding is less likely to occur, and the drum is less likely to deteriorate.

In the fiber processing device, the guide portion may be a convex portion that is disposed so as to intersect a surface orthogonal to the rotation axis and protrudes outward from the outer peripheral surface, the convex portion meandering in the direction of the rotation axis, and the restriction portion may be a bearing configured to rotate about the axis orthogonal to the rotation axis.

The position of the drum in the direction of the rotation axis depends on the position where the guide portion and the restriction portion contact. When the guide portion meanders in the rotation direction of the drum, the contact position between the guide portion and the restriction portion changes as compared with the case where the guide portion does not meander in the rotation direction of the drum, and the drum vibrates in the direction of the rotation axis. Thereby, the sieving performance of the drum is improved.

In the fiber processing device, the guide portion may be a groove that is disposed so as to intersect a surface orthogonal to the rotation axis and is recessed inward from the outer peripheral surface, the groove meandering in the direction of the rotation axis of the drum, and the restriction portion may be a bearing that is disposed inside the groove and configured to rotate about the axis orthogonal to the rotation axis.

The position of the drum in the direction of the rotation axis depends on the position where the guide portion and the restriction portion contact. When the guide portion meanders in the rotation direction of the drum, the contact position between the guide portion and the restriction portion changes as compared with the case where the guide portion does not meander in the rotation direction of the drum, and the drum vibrates in the direction of the rotation axis. Thereby, the sieving performance of the drum is improved.

A fiber body manufacturing apparatus includes the fiber processing device, a mesh that accumulates the fibers which pass through the openings, a pressurization section that pressurizes the fibers accumulated on the mesh, and a supply section that supplies a binder which binds the fibers to each other upstream of the pressurization section.

The fiber processing device has a long life because the drum is less likely to wear and the drum is less likely to deteriorate. The fiber body manufacturing apparatus including the fiber processing device also has a long life.

What is claimed is:

1. A fiber processing device comprising:
   a drum having a plurality of openings on an outer periphery, sieving a raw material containing fibers, and configured to rotate about a rotation axis;
   a housing that supports the drum;
   a guide portion provided on an outer peripheral surface of the drum; and
   a restriction portion that restricts movement of the drum in a direction of the rotation axis by contacting the guide portion, wherein
   at least one of the restriction portion and the guide portion is configured to rotate about an axis orthogonal to the rotation axis.

2. The fiber processing device according to claim 1, wherein
   the restriction portion is provided in the housing.

3. The fiber processing device according to claim 1, wherein
   the guide portion is a convex portion protruding outward from the outer peripheral surface, and
   the restriction portion is a bearing configured to rotate about the axis orthogonal to the rotation axis.

4. The fiber processing device according to claim 3, wherein
   an outer ring of the bearing is covered with a material having a hardness lower than a hardness of the convex portion.

5. The fiber processing device according to claim 1, wherein
   the guide portion is a groove recessed inward from the outer peripheral surface, and
   the restriction portion is a bearing that is disposed inside the groove and configured to rotate about the axis orthogonal to the rotation axis.

6. The fiber processing device according to claim 5, wherein
   an outer ring of the bearing is covered with a material having a hardness lower than a hardness of a wall surface of the groove.

7. The fiber processing device according to claim 1, wherein
   the guide portion is a bearing configured to rotate about the axis orthogonal to the rotation axis, and
   the restriction portion is a frame disposed in the direction of the rotation axis with respect to the bearing.

8. The fiber processing device according to claim 1, wherein
   the guide portion is a convex portion that is disposed so as to intersect a surface orthogonal to the rotation axis and protrudes outward from the outer peripheral surface, the convex portion meandering in the direction of the rotation axis, and
   the restriction portion is a bearing configured to rotate about the axis orthogonal to the rotation axis.

9. The fiber processing device according to claim 1, wherein
   the guide portion is a groove that is disposed so as to intersect a surface orthogonal to the rotation axis and is recessed inward from the outer peripheral surface, the groove meandering in the direction of the rotation axis of the drum, and
   the restriction portion is a bearing that is disposed inside the groove and configured to rotate about the axis orthogonal to the rotation axis.

10. A fiber body manufacturing apparatus comprising:
    the fiber processing device according to claim 1;
    a mesh that accumulates the fibers which pass through the openings;
    a pressurization section that pressurizes the fibers accumulated on the mesh; and
    a supply section that supplies a binder which binds the fibers to each other upstream of the pressurization section.

* * * * *